(12) United States Patent
Blay et al.

(10) Patent No.: US 11,859,924 B2
(45) Date of Patent: Jan. 2, 2024

(54) COOLING TOWER CONTROL SYSTEM

(71) Applicant: Baltimore Aircoil Company, Inc., Jessup, MD (US)

(72) Inventors: Preston Blay, Silver Spring, MD (US); Frank T. Morrison, Crownsville, MD (US); David Andrew Aaron, Reisterstown, MD (US)

(73) Assignee: Baltimore Aircoil Company, Inc., Jessup, MD (US)

( * ) Notice: Subject to any disclaimer, the term of this patent is extended or adjusted under 35 U.S.C. 154(b) by 77 days.

(21) Appl. No.: 17/318,431

(22) Filed: May 12, 2021

(65) Prior Publication Data

US 2021/0356221 A1     Nov. 18, 2021

Related U.S. Application Data

(60) Provisional application No. 63/023,467, filed on May 12, 2020.

(51) Int. Cl.
*F28C 1/00*     (2006.01)
*F28F 27/00*     (2006.01)

(52) U.S. Cl.
CPC .............. *F28F 27/003* (2013.01); *F28C 1/00* (2013.01)

(58) Field of Classification Search
CPC ................................. F28F 27/003; F28C 1/00
USPC ......................................................... 62/121
See application file for complete search history.

(56) References Cited

U.S. PATENT DOCUMENTS

| 4,273,146 | A | 6/1981 | Johnson |
| 4,683,101 | A | 7/1987 | Cates |
| 4,913,710 | A | 4/1990 | Reverdy |
| 5,150,581 | A | 9/1992 | Smith |
| 5,176,005 | A | 1/1993 | Kaplan |
| 5,232,636 | A | 8/1993 | Cates |

(Continued)

FOREIGN PATENT DOCUMENTS

CN     102083298 A    *    6/2011

OTHER PUBLICATIONS

14 GPM UV Whole House Water Treatment and Disinfection System by Pelican Water from The Home Depot website https://www.homedepot.com/p/Pelican-Water-14-GPM-UV-Whole-House-Water-Treatment-and-Disinfection-System-THD-PUV-14/300359402?MERCH=REC-_-pipsem-_-300359394-_-300359402-_-N; publicly available before May 12, 2020; 5 pages.

(Continued)

*Primary Examiner* — Davis D Hwu
(74) *Attorney, Agent, or Firm* — Fitch, Even, Tabin & Flannery LLP

(57) ABSTRACT

In one aspect, a cooling tower system is provided that includes an evaporative heat exchanger, a sensor configured to detect a parameter of evaporative liquid distributed onto the evaporative heat exchanger, and an evaporative liquid treatment system. The cooling tower system further includes a controller having a normal operating mode wherein the controller operates the evaporative liquid treatment system to treat the evaporative liquid upon a determination of inadequate evaporative liquid quality based at least in part on the parameter of the evaporative liquid. The controller has a failsafe operating mode wherein the controller changes operation of the cooling tower upon a determination that the operation of the evaporative liquid treatment system is unable to remedy the inadequate evaporative liquid quality.

59 Claims, 9 Drawing Sheets

(56) References Cited

U.S. PATENT DOCUMENTS

| | | |
|---|---|---|
| 5,328,600 A | 7/1994 | Cates |
| 5,405,541 A | 4/1995 | Pope |
| 5,435,382 A | 7/1995 | Carter |
| 5,480,564 A | 1/1996 | Pope |
| 5,724,828 A | 3/1998 | Korenic |
| 5,816,318 A | 10/1998 | Carter |
| 6,298,676 B1 | 10/2001 | Osborne |
| 6,415,615 B1 | 7/2002 | Osborne |
| 6,564,864 B2 | 5/2003 | Carter |
| 6,574,980 B1 | 6/2003 | Morrison |
| 6,644,566 B1 | 11/2003 | Garrish |
| 7,100,634 B2 | 9/2006 | Robb |
| 7,107,782 B2 | 9/2006 | Carter |
| 7,310,958 B2 | 12/2007 | Carter |
| 7,484,718 B2 | 2/2009 | Facius |
| 7,603,774 B2 | 10/2009 | Facius |
| 7,802,774 B2 | 9/2010 | Facius |
| 8,434,746 B2 | 5/2013 | Carter |
| 9,004,463 B2 | 4/2015 | Carter |
| 9,057,563 B2 | 6/2015 | Carter |
| 9,057,564 B2 | 6/2015 | Carter |
| 9,255,739 B2 | 2/2016 | Aaron |
| 9,279,619 B2 | 3/2016 | Aaron |
| 9,587,885 B2 | 3/2017 | Aaron |
| 9,803,929 B2 | 10/2017 | Aaron |
| 9,995,533 B2 | 6/2018 | Aaron |
| 10,132,577 B2 | 11/2018 | Martell |
| 10,288,351 B2 | 5/2019 | Aaron |
| 10,415,902 B2 | 9/2019 | Shin |
| 10,443,942 B2 | 10/2019 | Aaron |
| 10,571,197 B2 | 2/2020 | Beaver |
| 10,619,898 B2 | 4/2020 | Hollander |
| 10,619,953 B2 | 4/2020 | Blay |
| 10,627,176 B2 | 4/2020 | Shin |
| 10,641,554 B2 | 5/2020 | Beaver |
| 10,655,918 B2 | 5/2020 | Beaver |
| 10,677,538 B2 | 6/2020 | Shin |
| 10,677,543 B2 | 6/2020 | Auth |
| 10,775,117 B2 | 9/2020 | Rousselet |
| 10,794,643 B2 | 10/2020 | Shin |
| 11,029,093 B2 | 6/2021 | Shin |
| 2002/0005384 A1 | 1/2002 | Iseri |
| 2005/0133211 A1* | 6/2005 | Osborn ............... F28F 19/00 165/157 |
| 2011/0192179 A1 | 8/2011 | Freije, III |
| 2015/0204626 A1 | 7/2015 | Martell |
| 2020/0191506 A1 | 6/2020 | Landreth |
| 2020/0217602 A1 | 7/2020 | Blay |
| 2020/0256621 A1 | 8/2020 | Beaver |
| 2020/0256629 A1 | 8/2020 | Auth |
| 2021/0180891 A1 | 6/2021 | Rousselet |

OTHER PUBLICATIONS

2H Sanipacking® Fills—Anti-Legionella Fills for Cooling Towers; brochure from ENEXIO Water Technologies GmbH; publicly available before May 12, 2020; 2 pages.
AccuShield™ Anti-Microbial Products; brochure from Brentwood Industries; publicly available before May 12, 2020; 1 page.
Aquada UV; brochure from Wedeco, Inc.; publicly available before May 12, 2020; 2 pages.
Askew, S. et al.; Report: Microbiological Testing of Sanipacking Tower Fill; ONDEO Nalco Company; Dec. 12, 2003; 16 pages.
BAC Automatic Bleed Control BCP O D for evaporative cooling systems; brochure from Baltimore Aircoil International nv; PRD 1107 v01 EN, 2017; 2 pages.
BAC Control Package BCP 2 D for evaporative cooling systems; brochure from Baltimore Aircoil International nv; PRD 1106 v01 EN, 2017; 2 pages.
BCP Water Treatment overview from Balitmore Aircoil International nv website https://www.baltimoreaircoil.eu/en/products/BCP-dosing-and-control; publicly available before May 12, 2020; 2 pages.
Bhatia, A.; Cooling Water Problems and Solutions; Course No. M05-009; Paper from Continuing Education and Development, Inc.; publicly available before May 12, 2020; 56 pages.
BioCote® Antimicrobial Protection for Plastics & Polymers overview from BioCote Limited website https://www.biocote.com/treatable-materials/plastics-polymers/; publicly available before May 12, 2020; 3 pages.
Browning, Allan; Chlorine and Bromine Testing in Cooling Tower Systems; Blog from Chem Aqua, Inc. website https://www.chemaqua.com/en-us/Blogs/chlorine-and-bromine-testing-in-cooling-tower-systems#:~:text=Chlorine%20and%20bromine%20based%20biocides,kill%20bacteria%20and%20other%20microorganisms.&text=Low%20residuals%20can%20result%20in%20poor%20microbiological%20control; Jun. 25, 2019; 3 pages.
Buecker, Brad; Oxidizing Biocide Selection for Cooling Water Microbiological Control; Blog from ChemTreat, Inc. website https://www.chemtreat.com/oxidizing-biocide-selection-for-cooling-water- microbiological-control/; Apr. 2, 2020; 4 pages.
Carteau, David et al.; Development of Environmentally Friendly Antifouling Paints Using Biodegradable Polymer and Lower Toxic Substances; Progress in Organic Coatings, vol. 77, Issue 2, Feb. 2014, pp. 485-493.
CESA-am rPVC J90019 Safety Data Sheet from Clariant Plastics & Coating USA LLC; Version 1-0/USA; Revision date: Aug. 29, 2017; Date of printing: Jan. 25, 2019; 16 pages.
CESA® Additive Masterbatches Solutions for Plastics; brochure from Clariant International Ltd.; Sep. 2013; 11 pages.
CESA®-antimicro MB J90019 rPVC Antimicrobial Masterbatch, Technical Product Information from Clariant Corporation—Masterbatches Division; Nov. 3, 2017; 13 pages.
Cimetiere, Nicolas et al.; Effects of UV-Dechloramination of Swimming Pool Water on the Formation of Disinfection By-Products: A Lab-Scale Study; Microchemical Journal, vol. 112; Jan. 2014, pp. 34-41.
Clariant Masterbatches with CESA® Antimicrobial Fight Odor in Footwear; News from Clariant website https://www.clariant.com/en/Corporate/News/2014/04/Clariant-Masterbatches-with-CESA-reg--Antimicrobial-Fight-Odor-in-Footwear; Apr. 4, 2014; 2 pages.
Cobra UV® Ultraviolet Water Disinfection System—Installation, Operation and Maintenance Manual, Deluxe Models CB1SS-HOD, CB1-sD, CB1-HOD, CB2-HOD from UV Superstore, Inc .; publicly available before May 12, 2020; 34 pages.
DC Current Transducer CR5210-20; brochure from CR Magnetics, Inc.; publicly available before May 12, 2020; 2 pages.
Eco-ATWB Closed Circuit Cooler overview from Evapco, Inc. website https://www.evapco.com/products/closed-circuit-coolers-evaporative/eco-atwb-closed-circuit-cooler; publicly available before May 12, 2020; 3 pages.
Eco-ATWB-E Closed Circuit Cooler overview from Evapco, Inc. website https://www.evapco.com/products/closed-circuit-coolers-evaporative/eco-atwb-e-closed-circuit-cooler; publicly available before May 12, 2020; 4 pages.
Eco-ATWB-H Hybrid overview from Evapco, Inc. website https://www.evapco.com/products/closed-circuit-coolers-evaporative/eco-atwb-h-hybrid; publicly available before May 12, 2020; 4 pages.
ETS-UV™ Disinfection Generators—SW Model; product description from Evoqua Water Technologies LLC website https://www.evoqua.com/en/evoqua/products--services/disinfection-systems/uv-systems/ets-uv-disinfection-generators---sw-model/; publicly available before May 12, 2020.; 2 pages.
HXV Hybrid Cooler; brochure from Baltimore Aircoil Company website https://www.baltimoreaircoil.com/sites/default/files/sftp_import/resource-library/h/x/v/hxv_20200608.pdf; 2019; 4 pages.
Integrated Monitoring & Control Systems—Water Monitoring Systems overview from ChemTreat, Inc. website https://www.chemtreat.com/solutions/monitoring-and-control-systems/; publicly available before May 12, 2020; 2 pages.
International Search Report and Written Opinion from International Application No. PCT/US2021/031959, dated Aug. 10, 2021; 13 pages.
Kirschner, M.R.C. et al.; Antibacterial Polyamide Obtained by the Incorporation of Glass Microparticles Doped with Ionic Zinc and by Zinc Oxide Nanoparticle: Evaluation with *Salmonella typhimurium*

(56) References Cited

OTHER PUBLICATIONS and *Staphylococcus aureus*; Journal of Applied Polymer Science, 2017, DOI: 10.1002/ APP.45005; 11 pages.

Magnetically-Operated Switch, Model RH1; report from IDEC IZUMI Corporation Quality Assurance Center; File E66043, vol. 7, Sec. 1; Issued: Feb. 14, 1994, Revised: Sep. 22, 2000; 2 pages.

Marley Controls from SPX Cooling Technologies, Inc. website https://spxcooling.com/cooling-tower-parts/controls/; publicly available before May 12, 2020; 15 pages.

MarleyGard LINK™ BACnet/IP Communication Panel, user manual; from SPX Cooling Technologies, Inc. website https://spxcooling.com/wp-content/uploads/Z1126362.pdf; Sep. 2020; 10 pages.

MarleyGard LINK™ BACnet/IP Communication Panel; brochure from SPX Cooling Technologies, Inc. website https://spxcooling.com/wp-content/uploads/SPEC-LINK-20-1.pdf; Jul. 20, 2020; 1 page.

McCoy, William F.; SANIPACKING® Anti-Legionella Internals for Cooling Towers; Report from Phigenics, LLC; Jun. 2, 2005; 17 pages.

Microban® Antimicrobial Plastic Additives overview from Microban International website https://www.microban.com/antimicrobial-solutions/applications/antimicrobial-plastics; publicly available before May 12, 2020; 4 pages.

NEXUS® Modular Hybrid Cooler; brochure from Baltimore Aircoil Company website https://www.baltimoreaircoil.com/sites/default/files/sftp_import/resource-library/n/e/x/nexus_20200514.pdf; publicly available before May 12, 2020; 4 pages.

Oram, Brian; UV Disinfection Drinking Water Treatment; Water Research Watershed Center website https://www.water-research.net/index.php/water-treatment/water-disinfection/uv-disinfection; publicly available before May 12, 2020; 8 pages.

Pelican Basic Ultra Violet (UV) Disinfection System; product details from Pentair Pelican website https://www.pelicanwater.com/pelican-uv-basic.php?gclid=EAlaIQobChMI04y4wuS02QIVBEsNCh3yDwvPEAQYASABEg154vD_BwE#ID=PUV-7?mm_campaign=29038E65A0A569DC50D041C43DF27436&utm_source=Google&utm_medium=CPC&utm_campaign=WP-Shopping; publicly available before May 12, 2020; 2 pages.

Polaris 1 GPM 1/4" MNPT Ultraviolet Disinfection System; overview from US Water Systems, Inc. website https://www.uswatersystems.com/polaris-1-gpm-ultraviolet-disinfection-system-uv-1c.html; publicly available before May 12, 2020; 2 pages.

ProMinent® Water Treatment Controllers & Transmitters overview from ProMinent Fluid Controls, Inc. website https://www.prominent.us/products/Controllers_Monitors/Water_Treatment_Controllers/Water_Treatment_Controllers_Transmitters; publicly available before May 12, 2020; 5 pages.

Pulse~Pure® Installation, Operation & Maintenance Manual from Evapco, Inc. website https://www.evapco.com/sites/evapco.com/files/2020-12/Pulse-Pure-IOM-EVAPCO-061218.pdf; 2018; 40 pages.

Pulse~Pure® Water Treatment System overview from Evapco, Inc. website https://www.evapco.com/products/water-treatment-systems/pulsepurer-water-treatment-system; publicly available before May 12, 2021; 3 pages.

PureLine D™ Datasheet; from Aquionics Limited; 2017; 2 pages.

SAGE Control System overview from Evapco, Inc. website https://www.evapco.com/technologies/sage; publicly available before May 12, 2020; 2 pages.

Sanitron® Installation, Operation & Maintenance Owner's Manual for Models S2400C & S5,000C, S10,000C, S15,000C, S20,000C & S25,000C High Capacity Systems; from Atlantic Ultraviolet Corporation; Apr. 2011; 20 pages.

Sanitron® Ultraviolet Water Purifiers; brochure from Atlantic Ultraviolet Corporation; Jan. 2018; 12 pages.

Sanitron® UV Water Purifiers 3-40 GPM—Single Chamber Models; overview from Atlantic Ultraviolet Corporation website https://www.buyultraviolet.com/sanitron-uv-water-purifiers-single-chamber; publicly available before May 12, 2020; 4 pages.

Smart Shield®—Coolers and Condensers overview from Evapco, Inc. website https://www.evapco.com/products/water-treatment-systems/smart-shieldr-coolers-and-condensers; publicly available before May 12, 2020; 3 pages.

Smart Shield®—Towers overview from Evapco, Inc. website https://www.evapco.com/products/water-treatment-systems/smart-shieldr-towers; publicly available before May 12, 2020; 3 pages.

Smart Shield® Installation, Operation & Maintenance Manual from Evapco, Inc. website https://www.evapco.com/sites/evapco.com/files/2017-09/1%20Smart%20Shield%20IOM%20Factory%20Mount.pdf; publicly available before May 12, 2020; 14 pages.

Smart UV Sterilizers; product description from Pentair AES website https://pentairaes.com/smart-uv-sterilizers-31295.html; publicly available before May 12, 2000; 2 pages.

Spiliotopoulou, Aikaterini et al.; Disinfection By-Product Formation of UV Treated Swimming Pool Water; published in Proceedings of the 6th International Conference Swimming Pool & Spa; 2015; 8 pages.

TrilliumSeries™ Adiabatic Condenser Self-Clean Cycle; brochure from Baltimore Aircoil Company website https://www.baltimoreaircoil.com/download_api_endpoint/1495/prd217_selfclean_20180510.pdf; 2018; 2 pages.

TrilliumSeries™ Adiabatic Products; brochure from Baltimore Aircoil Company website https://www.baltimoreaircoil.com/download_api_endpoint/1938/trillium_brochure_20200327.pdf; 2020; 4 pages.

UL 1995 Standard for Saftey—Heating and Cooling Equipment; Underwriters Laboratories, Inc.; CSA C22.2 No. 236-15; Jul. 31, 2015; 194 pages.

Ultraviolet (UV) Lamp Safety Data Sheet from Trojan Technologies Group ULC; 2018; 9 pages.

Understanding UV Dose from Aquatell Inc. website https://www.aquatell.com/pages/understanding-uv-dose; publicly available before May 12, 2020; 2 pages.

UV Disinfection System for Water Treatment; Blog from ALFAA UV website https://www.alfaauv.com/blog/uv-disinfection-system-water-treatment/; publicly available before May 12, 2020; 6 pages.

UV Transmittance (UTI); parameters overview from Real Tech Inc. website https://realtechwater.com/parameters/uv-transmittance/; publicly available before May 12, 2020; 2 pages.

Viqua Owner's Manual—Models: VH200, VH410, VP600, VP950, VH410M, VP600M, VP950M; from Viqua, Inc., 520110_RevT; publicly available before May 12, 2020; 20 pages.

Viqua Owner's Manual: Model: D4 Premium, E4, F4; +Models: D4+, E4+, F4+, E4-50+, F4-50+; Validated Models: E4-V, F4V, D4-V+, E4-V+, F4-V+; from Viqua, Inc. , 520351-R_RevD; publicly available before May 12, 2020; 26 pages.

Viqua Sterilight VH410 UV System; product description from Aquatell, Inc. website https://www.aquatell.com/products/viqua-sterilight-vh410-uv-system; publicly available before May 12, 2020; 2 pages.

Viqua™—High Output Professional Series; product guide from Viqua, Inc., 520377-R_RevC; publicly available before May 12, 2020; 30 pages.

Viqua™—Ultraviolet Water Disinfection System: VP600, VP950, E4, E4+, F4, & F4+; brochure from Viqua, Inc.; 2017; 2 pages.

VIQUA™ VP600; product details from Viqua website https://viqua.com/product/vp600/?features; publicly available before May 12, 2020; 3 pages.

W100W Series; brochure from Walchem, Iwaki America Inc.; Oct. 2016; 4 pages.

W600 Seriew Controllers; brochure from Walchem, Iwaki America Inc., Oct. 2017; 6 pages.

Water Treatment Controllers overview from Advantage Controls website https://www.advantagecontrols.com/products_2.php; publicly available before May 12, 2020; 1 page.

Wedeco Aquada Series UV Disinfection System; overview from Xylem UK website https://www.xylem.com/en-uk/products-services/treatment-products--systems/disinfection-and-oxidation/uv-disinfection-systems/aquada-series-uv-disinfection-system; publicly available before May 12, 2020; 6 pages.

Which UV Filter is Right for You?; from Pentair Pelican website https://www.pelicanwater.com/which-uv-filter-is-right-for-you/; publicly available before May 12, 2020; 3 pages.

(56) References Cited

OTHER PUBLICATIONS

Zinc-PYRION Safety Data Sheet; Janssen Pharmaceutica NV; Version 1.42, Revision date: Oct. 14, 2017; SDS No. 100000003618; Date of last issue: Sep. 21, 2017; Date of first issue: Aug. 27, 2014; 16 pages.

* cited by examiner

- Manual Inputs -

500

-Are there sump heaters?
-Can unit operate in wet mode below freezing?
-Minimum allowable spray water temperature to operate in wet mode?
-Is there a UV Lamp on Make-up?
-Is there a UV Lamp in a side stream?
-If high water level is detected, shut off the water supply by water valve?
-During Failsafe mode, is it desired to bypass water quality sensors and simply flush more often?
-Is the water quality periodically analyzed offsite?
    -Can the offsite water quality be remotely inputted?
    -what is the Conductivity level?
    -what is the bioactivity and/or biofilm level?
    -what is the pH level of sump and make-up Conductivity Control:
- Does a water Treatment Company control the bleed-off?
- Conductivity level bleed off is turned on by Water Treatment Company?
- Conductivity level bleed off is turned off by Water Treatment Company?
- Is it desired to have controller 52 operate as a back-up to bleed off operation? If yes
  - Conductivity low level when bleed off is turned on and differential
  - Conductivity high level when bleed off is turned off and differential Microbial Control:
- Minimum effective UV Lamp intensity before cleaning is needed or an alarm is required?
- Maximum acceptable bioactivity or biofilm level and differential
- Preference to shut unit off or operate dry under upset conditions?
- Is unit equipped with back-up/emergency antimicrobial chemicals?
- Is adding chemicals preferred first before flushing?
- Number flush cycles before activating Failsafe mode?

\- Manual Inputs (cont.) -         ⟵ 500

| | |
|---|---|
| pH Control: | -Minimum and maximum level of pH?<br>-Unit equipped with back-up/emergency pH control chemicals?<br>-pH level of make-up water?<br>-Preference to add chemicals first or flush first to correct pH? |
| Drift Control: | -Maximum allowable drift rate and differential?<br>-Is bioactivity above the allowed level?<br>-Preference to lower fan speed, shut unit off or operate in dry mode? |
| Plume Control: | -Is unit equipped with plume sensor?<br>-At what plume level is plume abatement needed and differential?<br>-Preference to operate plume abatement system, shut system off or operate dry? |
| Flush Cycle: | -How many flush cycles during the Normal operating mode before activating failsafe mode?<br>-How often should the flush cycle operate during Normal Operating Mode?<br>-How often should the flush cycle operate during an upset condition in the Normal Operating Mode?<br>-How often should the flush cycle operate during the Failsafe mode?<br>-Is unit equipped to add biocides during the flush cycle?<br>-Is unit equipped with a two speed pump which operates at high speed during the flush mode? |
| Dry Cycle: | -Is there a preference to occasionally run dry cycles?<br>-How long to operate the dry cycle?<br>-Is it desired to drain the water when the wet mode is not needed or keep water in the sump? |

FIG. 5B

COOLING TOWER CONTROL SYSTEM

CROSS-REFERENCE TO RELATED APPLICATION

This application claims the benefit of U.S. Provisional Patent App. No. 63/023,467, filed May 12, 2020, which is hereby incorporated by reference in its entirety.

TECHNICAL FIELD

This application relates to cooling towers and, more specifically, to control systems for cooling towers.

BACKGROUND

Cooling towers often distribute evaporative liquid, such as water, onto an evaporative heat exchanger of the cooling tower. Cooling tower operation typically involves the use of a water treatment specialist to design and implement a water treatment system of the cooling tower. The water treatment system typically requires multiple chemicals to control biological growth, corrosion, scaling, and fouling as well as water use minimization. This can be costly, time consuming, and burdensome for smaller facilities with little to no on-site maintenance staff, especially in areas with challenging water treatment requirements such as large urban areas. In addition, when any of the water quality parameters exceed a specified tolerance level or the measuring sensors are faulty, even when an alarm is sent, the cooling tower can be left running with potentially high microbial content and/or with corrosive water which can damage the cooling tower or environment.

SUMMARY

In one aspect of the present disclosure, a cooling tower system is provided that includes a cooling tower and a controller operably coupled to the cooling tower. The cooling tower includes an evaporative heat exchanger and the cooling tower is operable to distribute an evaporative liquid onto the evaporative heat exchanger. The cooling tower includes a sensor, which is configured to detect a parameter of the evaporative liquid, and an evaporative liquid treatment system.

In one embodiment, the cooling tower is an open circuit direct evaporative cooling tower and the evaporative heat exchanger includes fill. The evaporative liquid comprises process fluid the cooling tower receives from a building or industrial process. The process fluid may be water or a water mixture (e.g., water and glycol). In another embodiment, the cooling tower is a closed circuit indirect evaporative cooling tower and the evaporative heat exchanger includes an indirect evaporative heat exchanger, comprising serpentine tubes, plates, and/or fins, which receives a process fluid. The evaporative liquid of the closed circuit indirect evaporative cooling tower may be water, as one example. The cooling tower distributes the water onto the indirect evaporative heat exchanger.

The controller has a normal operating mode wherein the controller operates the evaporative liquid treatment system to treat the evaporative liquid upon a determination of inadequate evaporative liquid quality based at least in part on the parameter of the evaporative liquid. The controller further includes a failsafe operating mode wherein the controller changes operation of the cooling tower upon a determination that the operation of the evaporative liquid treatment system is unable to remedy the inadequate evaporative liquid quality. In this manner, the cooling tower system may continue to operate in a safe manner despite the inadequate evaporative liquid quality until the system is serviced. The controller, in the failsafe operating mode, operates the cooling tower to satisfy a requested cooling load while operating in a safe manner. If the cooling tower is unable to satisfy the requested cooling load, the controller in the failsafe operating mode operates the cooling tower to provide the maximum cooling capacity possible while still operating in the safe manner.

In one embodiment, the cooling tower is operable in a plurality of modes including a wet mode and a dry mode. The controller, in the normal operating mode, permits operation of the cooling tower in the wet mode and the dry mode. The controller, in the failsafe operating mode, refrains from operating the cooling tower in the wet mode. The cooling tower may thereby continue to operate in the dry mode to remove heat from the process fluid until the cooling tower is serviced and able to operate safely in the wet mode.

In some embodiments the cooling tower is operable in a dry mode or an adiabatic mode. For example, the cooling tower may have an indirect heat exchanger including coils that receive a process fluid and an adiabatic cooler including adiabatic pads and a water distribution system. The water distribution system distributes water onto the adiabatic pads to pre-cool air upstream of the coils. In the failsafe operating mode, the controller refrains from operating the cooling tower in the adiabatic mode but may operate the cooling tower in the dry mode.

Another embodiment of the cooling tower is operable in a dry mode, an adiabatic mode, or a wet mode. The controller, in the failsafe operating mode, refrains from operating the cooling tower in the wet mode and the adiabatic mode. The controller, however, may operate the cooling tower in the dry mode.

In another aspect of the present disclosure, a cooling tower is provided that includes an evaporative heat exchanger configured to receive a process fluid and a fan assembly operable to cause airflow relative to the evaporative heat exchanger. The cooling tower further includes an evaporative liquid distribution system including at least one outlet to distribute evaporative liquid onto the evaporative heat exchanger, a sump to collect evaporative liquid from the evaporative heat exchanger, and an evaporative liquid treatment system of the evaporative liquid distribution system. The evaporative liquid treatment system may include, for example, a water makeup supply and a UV light assembly operable to treat makeup water. In one embodiment, the UV light assembly is mounted in a heat exchange section of the cooling tower or in an evaporative liquid side loop. As another example, the evaporative liquid treatment system includes a chemical treatment system operable to add one or more chemicals to the evaporative liquid.

The cooling tower further includes a controller and an evaporative liquid sensor configured to detect an evaporative liquid parameter. The controller is configured to operate the evaporative liquid treatment system upon a determination of inadequate evaporative liquid quality based at least in part on the evaporative liquid parameter. The controller is further configured to change operation of the evaporative liquid distribution system to facilitate safe operation of the cooling tower upon a determination that the evaporative liquid treatment system is unable to remedy the inadequate evaporative liquid quality. The changed operation of the evaporative liquid distribution system permits the cooling tower to continue running until the condition causing the inadequate evaporative liquid quality is addressed. The condition causing the inadequate liquid quality may be, for example, a failed sensor of the cooling tower.

The present disclosure also provides a method of operating a cooling tower. The method includes distributing an evaporative liquid onto an evaporative heat exchanger of the cooling tower and detecting a parameter of the evaporative liquid using a sensor of the cooling tower. The method further includes operating an evaporative liquid treatment system of the cooling tower upon a determination of inadequate evaporative liquid quality based at least in part on the evaporative liquid parameter. Further, the method includes changing operation of the cooling tower to facilitate safe operation of the cooling tower upon a determination that the evaporative liquid treatment system is unable to remedy the inadequate evaporative liquid quality.

BRIEF DESCRIPTION OF THE DRAWINGS

FIGS. 5A and 5B are a list of optional, manual inputs that a control system of a cooling tower may use to make operational decisions in place of automated sensors for some or all of the inputs or control points in accordance with examples described herein.

DETAILED DESCRIPTION

Figure 1:
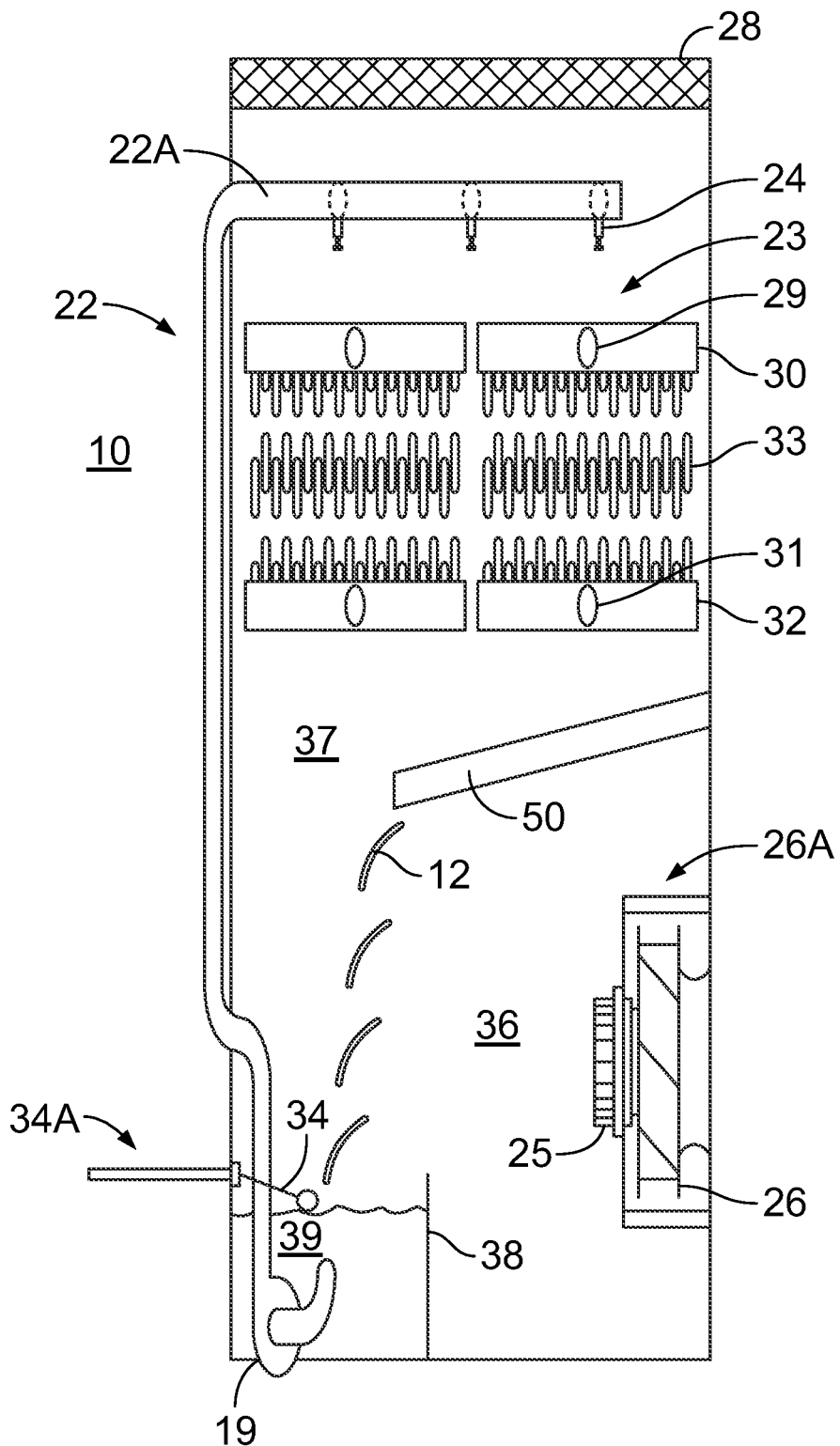
FIG. 1 is an elevational view of a cooling tower having an evaporative indirect heat exchanger in accordance with an embodiment of the present disclosure.

In one aspect of the present disclosure, a cooling tower and related control system is provided. The control system monitors the condition of evaporative liquid utilized by the cooling tower and may make operational changes in order to reduce the chance for microbial contamination, corrosion, and/or scaling during upset conditions while keeping the cooling tower operating efficiently between water treatment and cooling tower service visits. The evaporative liquid may be water or, in some embodiments, a mixture of water and one or more other liquids such as liquid treatment chemicals. Parameters of evaporative liquid utilized by the cooling tower is continuously monitored, including conductivity, bioactive material, biofilms, pH level, plume, and drift. The control system can also be configured to continuously monitor operating parameters of the cooling tower, such as ambient temperature, spray water temperature, sump water levels, spray pump operation, sump sweeper pump, side stream UV pump operation, and UV lamp intensity on make-up, within the sump, and/or side stream loops to provide input into a control algorithm of the control system. For the purposes of this disclosure, the term "cooling towers" refers to, but is not limited to, open circuit direct evaporative cooling towers, closed circuit evaporative fluid coolers, evaporative condensers, adiabatic coolers such as spray and/or pad type units, adiabatic condensers, and related components.

The control system includes a controller having a normal operating mode and a failsafe operating mode. During the normal operating mode, the controller may be configured to, on a regular basis, automatically purge then flush the water touched components of the water tower and/or add water treatment to keep the cooling tower evaporative liquid within specified tolerance levels to prevent microbial contamination and scaling while striving to conserve water and water treatment chemicals. If, however, a determination of inadequate evaporative liquid quality occurs, one or more attempts are made to automatically resolve the issue. If, after a prescribed number of attempts to correct the evaporative liquid quality issue have been performed and the measured evaporative liquid quality parameters remain in an unacceptable range, or if any of the sensors fail, the controller enters the failsafe mode. The number of attempts may be set by a user, such a three or five attempts, or may be set or adjusted by a remote computer such as by a server computer that utilizes machine learning to determine a number of attempts based on the operation of similar cooling towers in similar geographical areas, as one example.

In some embodiments, the failsafe operating mode can be configured to keep the cooling tower and nearby area or environment in a safer condition until service personnel arrive. The failsafe mode may involve operating cooling tower fans, pumps, and other components to either limit the possibility of biological contamination from leaving the cooling tower in the case of a component or sensor failure, or take additional actions to improve operation, depending on need, including increased purge and flush cycles, limiting fan speed, increased water sterilization, or even complete water removal for dry operation.

In one embodiment, the failsafe operating mode operates the cooling tower, such as by utilizing cooling tower parameters, such as sump pump on/off, pump speed, frequency of purge/flush cycles, and/or evaporative liquid treatment chemical application, that keeps the cooling tower from damaging itself. For example, the failsafe operating mode may involve the controller refraining from running a pump without fluid and/or operating a fan that is unbalanced. In one example in this regard, the cooling tower may include a fan assembly having an electronically commutated (EC) motor. The EC motor has a motor controller configured to detect excess vibration and send an alert to the controller of the cooling tower that there is an issue with the fan. The controller enters the failsafe operating mode in response to receiving the alert from the motor controller. In the failsafe operating mode, the controller and the fan motor controller cooperate to allow the fan to operate up to a threshold speed that results in a maximum permitted vibration. The controller and fan motor inhibit operation of the fan beyond the threshold speed. In some examples, the control logic includes a purge and flush cycle where the cooling tower water is drained then refilled and recirculated through the sump, water distribution system and evaporative heat exchangers to scrub the surfaces with fresh clean water. The purge and flush cycle can be run one or more times when attempting to remedy (or correct) a water quality issue and while keeping the cooling tower running. The purge and flush cycle can be configured to reduce the amount of microbes and solids in the water, inhibit solids and contaminants from laying on the bottom and sides of the sump, and limit the potential for microbial contamination and scaling. While the subject disclosure is applicable to all cooling towers, cooling towers employing extremely low volume sumps limit the amount of water used during the purge and flush cycle. For example, if the sump is less than half the size of the cooling tower footprint, then only half of the water is purged as compared to prior cooling towers, which can be a significant water savings. Further, in some examples, the control logic may include a dry out cycle that runs occasionally to dry out the water contact surfaces to further reduce the risk of microbial contamination. Removing the water from the water contact surfaces kills microbes on the water contact surfaces.

FIG. 1 shows an evaporative heat exchanger cooling tower 10. The cooling tower 10 has a spray pump 19, fan motor 25, a fan assembly 26A including a fan 26 and a motor 25, and an evaporative liquid collector such as a water collection system 50. The cooling tower 10 further includes an indirect evaporative heat exchanger such as serpentine tube heat exchangers 23, an evaporative liquid distribution system such as a spray water distribution system 22, drift or mist eliminators 28, spray water nozzles 24, and a sump such as a spray water sump 39. The spray water sump 39 is less than half the size of the cooling tower 10 footprint which reduces the volume of water used by the cooling tower 10 when the cooling tower 10 purges the water. In other embodiments, the sump may be any size up to and including the full size of the footprint of the cooling tower 10.

Process fluid enters the serpentine tube heat exchangers 23 via a connection 29 and header 30. The process fluid leaves the serpentine tube heat exchangers 23 conditioned having passed through serpentine tubes 33, through outlet header 32, and then to connection 31. The flow of process fluid through the connections 29, 31 may be reversed in some cases. Specifically, the process fluid may enter the serpentine tube heat exchangers 23 via the connection 31 and exit the serpentine tube heat exchangers 23 via the connection 29.

During dry operation of the cooling tower 10, the spray pump 19 is turned off and the motor 25 rotates the fan 26 at a speed to achieve a setpoint requested by, for example, a HVAC system, an industrial process system, and/or a user. The fan 26 draws air into the cooling tower 10 and pressurizes dry plenums 36 and 37, which guides air up through indirect heat exchangers 23 and out through mist eliminators 28. The serpentine tube heat exchangers 23 shown are of the serpentine tube-type which is well known in the industry, but the heat exchanger utilized by the cooling tower 10 may be of any type of evaporative heat exchanger including indirect heat exchangers, such as tube and fin heat exchangers and/or plate-style heat exchangers, and/or direct heat exchangers such as fill.

During wet operation of the cooling tower 10, the spray pump 19 is turned on and pumps water from sump 39 to distribution pipe 22A then out of nozzles 24. The evaporative spray water forms small droplets as the water exits nozzles 24 and cascades down onto and through the indirect heat exchangers 23. Water that evaporates during the heat transfer process or water that is bled off via sump drain valve 48 to keep the solids content within acceptable limits is replaced through make-up float valve assembly 34 of a water makeup supply 34A. The sump drain valve 48 may have a partially open configuration that permits a limited flowrate of water containing solids in the sump 39 to bleed off from the sump 39. The bleeding off of water containing solids and subsequent refilling of the sump 39 with makeup water via the makeup water supply 34A functions to decrease the solids in the sump 39. The sump drain valve 48 may have a fully open configuration that permits a larger flowrate of water to exit the sump 39, the fully open configuration of the sump drain valve 48 being used to purge the sump 39.

The cooling tower 10 may include a water level device that actuates a solenoid fill valve to keep water in the sump 39 at a set level. Air is drawn in by fan 26 which is rotated by motor 25. The speed of motor 25 is determined by the requested system control setpoint. Once water drops off the indirect heat exchangers 23, at least a portion of the water is caught by water collectors 50 and that water is guided away from the fan and towards the sump 39 by water baffles 12. Some of the water falling off the left side indirect heat exchanger 23 cascades down directly into sump 39.

In the cooling tower 10, a portion of the air travels through water collectors 50 and through water baffles 12 forming a dry zone plenum 36 and a wet zone plenum 37. During wet operation of the cooling tower 10, there is a dry air zone in plenum 36 and a wet zone formed in plenum 37. The combination of the water collectors 50 and sump wall 38 forms a smaller sump 39, typically at least half than the full footprint of cooling tower 10 which allows easier management of the sump water from a biologic and water waste standpoint. Other cooling tower configurations, including examples of water collectors, are provided in U.S. Pat. No. 10,677,543, which is hereby incorporated by reference in its entirety.

Figure 2:
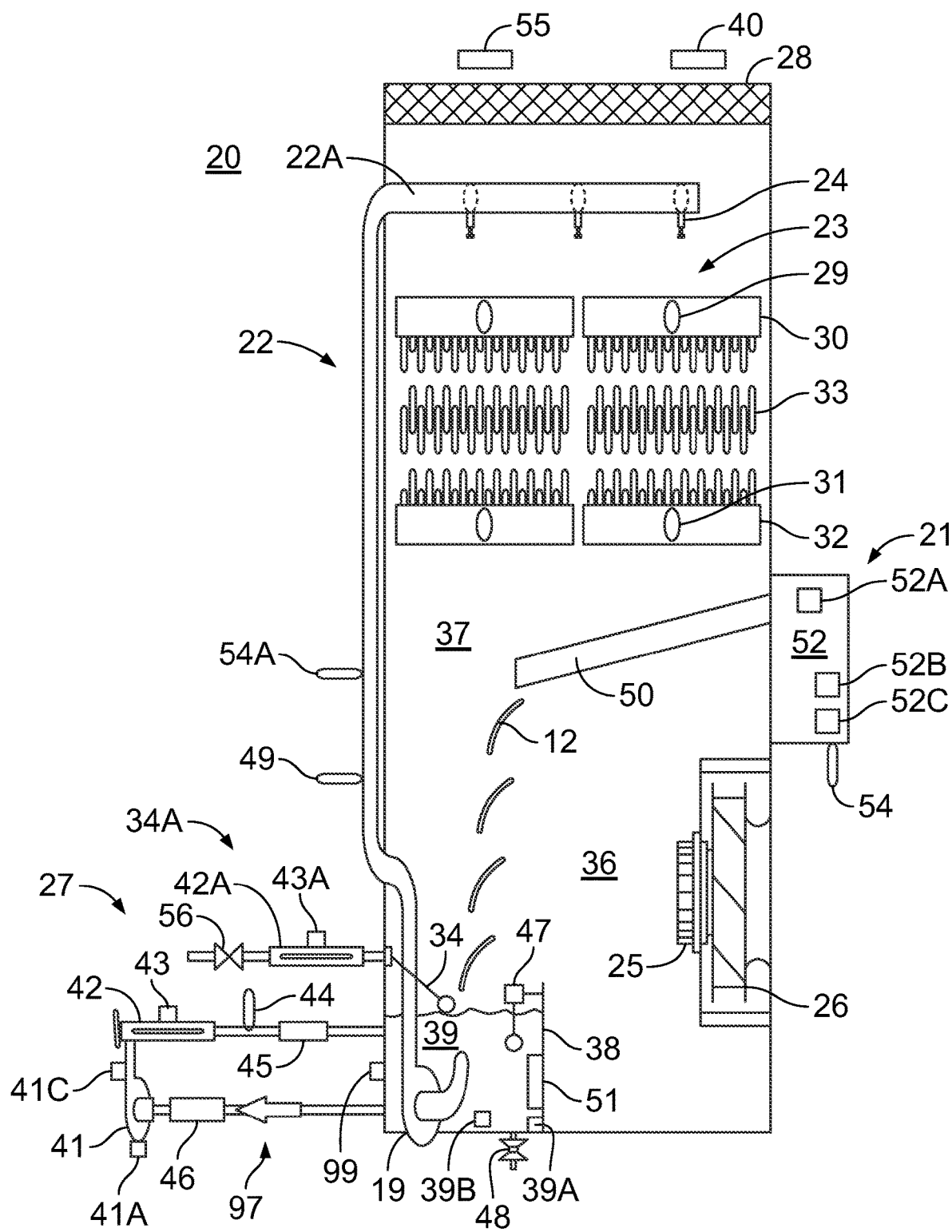
FIG. 2 is an elevational view of a cooling tower having an evaporative indirect heat exchanger product in accordance with another embodiment of the present disclosure.

With reference to FIG. 2, a cooling tower 20 is provided that is similar to the cooling tower 10 with similar reference numerals indicating similar components. The cooling tower 20 has a control system 21 including various sensors and a controller 52 to facilitate operation of the cooling tower 20. The cooling tower 20 includes an ambient temperature sensor 54 configured to sense outdoor ambient air temperature and a spray water temperature sensor 54A configured to sense the temperature of the water in the spray water distribution system 22. Signals from the ambient temperature sensor 54 and the spray water temperature sensor 54A are sent to controller 52 for evaluation. The functionality of controller 52 is shown in the logic flow diagrams of FIGS. 3A-3C and 4A-4B and discussed further below.

The cooling tower 20 has an evaporative liquid treatment system 27 including a UV light 42A installed on the incoming make-up water line 34 may be used to reduce the microbial content entering embodiment 20 from the make-up water line 34. UV lamp intensity sensor 43A may be used to signal when the lamp is not operating or not operating at the minimum allowed intensity and sends an alarm that UV light 42A needs to either be cleaned or replaced. A UV light installed in the sump 39, below mist eliminators 28, in wet air zone 37, or in the spray water distribution system 22 may also be employed.

In one embodiment, the evaporative liquid treatment system 27 includes a UV pump 41, pH sensor 46, UV light 42, UV light sensor 43, a flow proving switch 41C, and a conductivity sensor 45. The UV pump 41 is configured to draw a side stream of water from the sump 39, through the pH sensor 46, through the UV light 42, across the flow proving switch 44, and through conductivity sensor 45, then back into sump 39. In another approach, the pump 41 is determined to be operating by using a pressure differential switch or transducer connected to pump suction and pump discharge pipes or via a current sensor. Whenever there is water present in sump 39 as evidenced by sump float sensor 47, the UV side stream pump 41 will be operated continuously or intermittently to monitor the pH level 46, conductivity level 45, and to run the sump water 39 through UV light 42 to reduce microbial contamination.

Sump float sensor 47 may be a dual function sensor that also operates as a high-water level float sensor to sense that water is too high and is being wasted. UV lamp intensity sensor 43 is used to signal when the lamp 42 is not operating or not operating at the minimum required intensity and sends a status signal to the controller 52 to be evaluated.

The pH sensor 46 measures the pH of the sump water. Conductivity sensor 45 measures the dissolved solids, such as total dissolved solids, in the water of the sump 39. The controller 52 evaluates the conductivity level and the function of the conductivity sensor 45.

Spray pump flow switch 49 determines whether the spray pump 19 is running and alerts the controller 52 of the status of the spray pump 19.

Drift sensor 40, located above mist eliminators 28, senses if the drift is greater than a threshold or accepted tolerance level and sends a signal to the control system 52 to be evaluated.

Plume sensor 55, located above mist eliminators 28, senses if the plume is greater than an accepted tolerance level and sends a signal to the controller 52 to be evaluated.

Biofilm sensor 51 senses if there are biofilms forming in sump 39. If there are biofilms present, the biofilm 51 sends a signal to the controller 52 to be evaluated. Biofilm sensors may be mounted in other wet locations in the cooling tower 20.

Sump drain valve 48 is controlled by controller 52 and may be fully open, fully closed or partially open as determined by controller 52 and will be described later.

Electrically operated emergency shut off water make-up valve 56 is set to be open unless the high-water level alarm from sump float sensor 47 senses that water is being wasted and the situation is evaluated by the controller 52.

The various sensors of the cooling tower 20 send data indicative of the associated sensed parameters to the controller 52. The sensors may perform edge processing such that the sensors compare a sensed parameter to a threshold, range, and/or tolerance and send data to the controller 52 indicative of whether the parameter is unacceptable (or acceptable). In other approaches, one or more of the sensors communicate data indicative of the sensed parameters to the controller 52 and the controller 52 determines whether the parameters are unacceptable (or acceptable), such as the parameters being above/below a threshold, within/outside of a range or tolerance, etc.

For the cooling tower 20 shown in FIG. 2, the evaporative cooling equipment is shown as forced draft, single-singled air inlet configuration with an indirect heat exchanger but it should be understood to be a non-limiting example. The fan system utilized may be any style fan system that moves air through the unit including but not limited to forced draft in a generally counterflow, crossflow or parallel flow with respect to the spray. The fan system may also be of an induced draft style in a counterflow, parallel, or crossflow orientation by way of a non-limiting examples. The fan location and the direction of the air intake and discharge may be different for a particular application and are not a limitation to the embodiment presented.

Additionally, motor 25 may be directly connected to the fan 26 as shown or be driven by a belt or gear arrangement. The process fluid direction may be reversed to optimize heat transfer and is not a limitation to the embodiment presented. It also should be understood that the number of circuits and the number of passes or rows of tube runs within an indirect heat exchanger 23 is not a limitation to embodiments presented.

Furthermore, it should be understood that the type of evaporative heat exchanger utilized in the cooling tower 10 may be selected for a particular application. While FIG. 2 shows an indirect heat exchanger 23, that evaporative heat exchanger could also be a direct heat exchanger such as with cooling tower fill by way of example. Cooling fill may include, for example, PVC sheets with raised features and/or blocks.

Therefore, the cooling towers disclosed herein may utilize various types of evaporative heat exchangers, including but not limited to an indirect, direct, a combination of an indirect and a direct or an adiabatic air cooler, fluid cooler, or condenser.

The controller 52 includes a processor 52A, a non-transitory computer readable memory such as memory 52B, and communication circuitry 52C. The memory 52B includes computer readable instructions such as source code to implement the logic of FIGS. 3A-C and 4A-C. The communication circuitry 52C is capable of wired and/or wireless communications. In one embodiment, the communication circuitry 52C includes a network interface that communicates with one or more networks such as a local wired network (e.g., ethernet), a local wireless network (e.g., Wi-Fi), a wide area wireless network (e.g., cellular), and/or the internet. The control logic of FIGS. 3A-3C and 4A-4B may be implemented by the processor 52A, by a remote computing device such as a server computer (e.g., a cloud-based computing system) or a user device (e.g., a smartphone, tablet computer, or desktop computer) in communication with the processor 52A via the communication circuitry 52C, or by a combination of the processor 52A and the remote computing device.

Figure 3A:
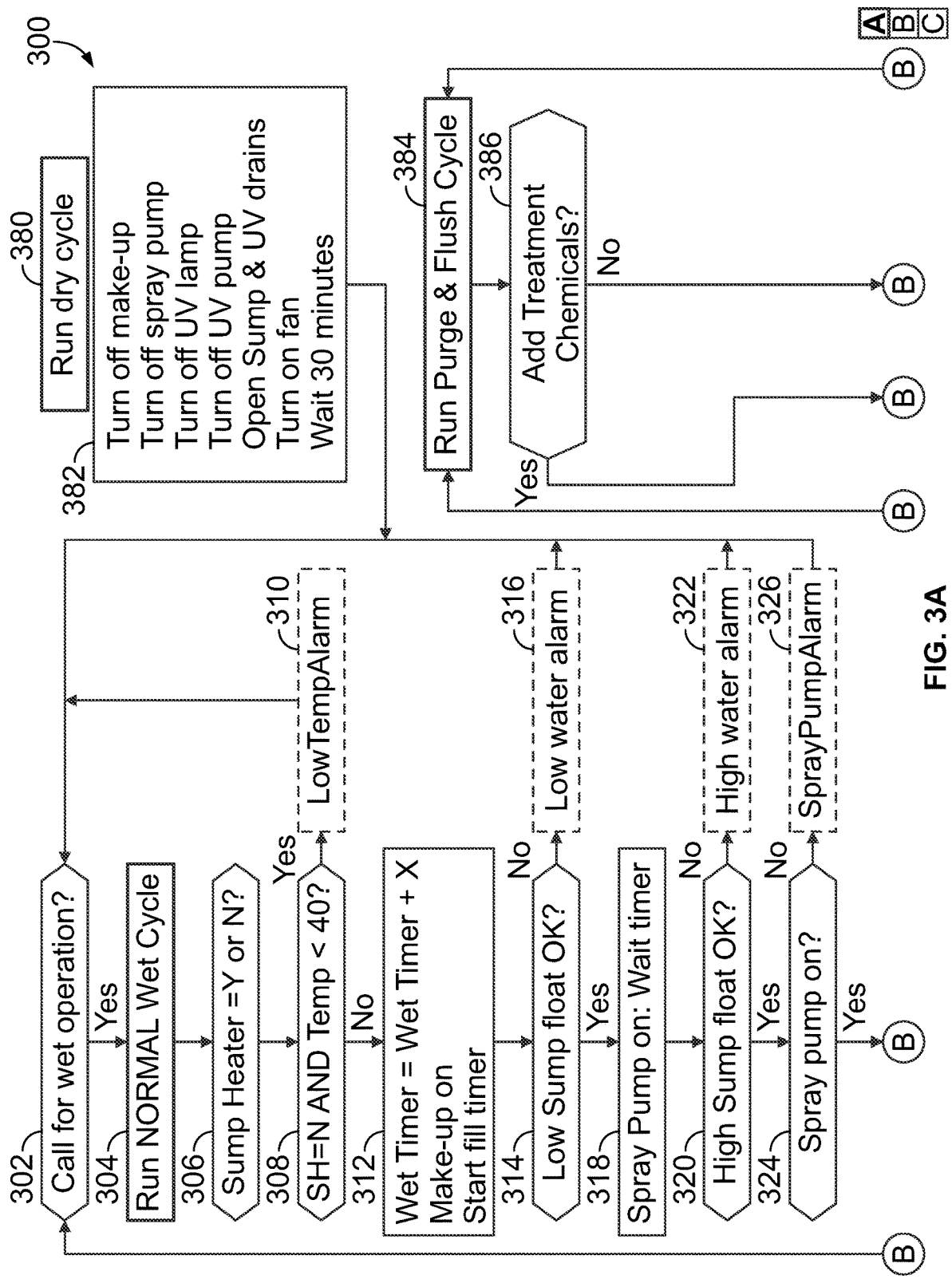
FIGS. 3A, 3B, and 3C provide a control logic diagram in accordance with a normal operating mode of a controller of a cooling tower.
Figure 3B:
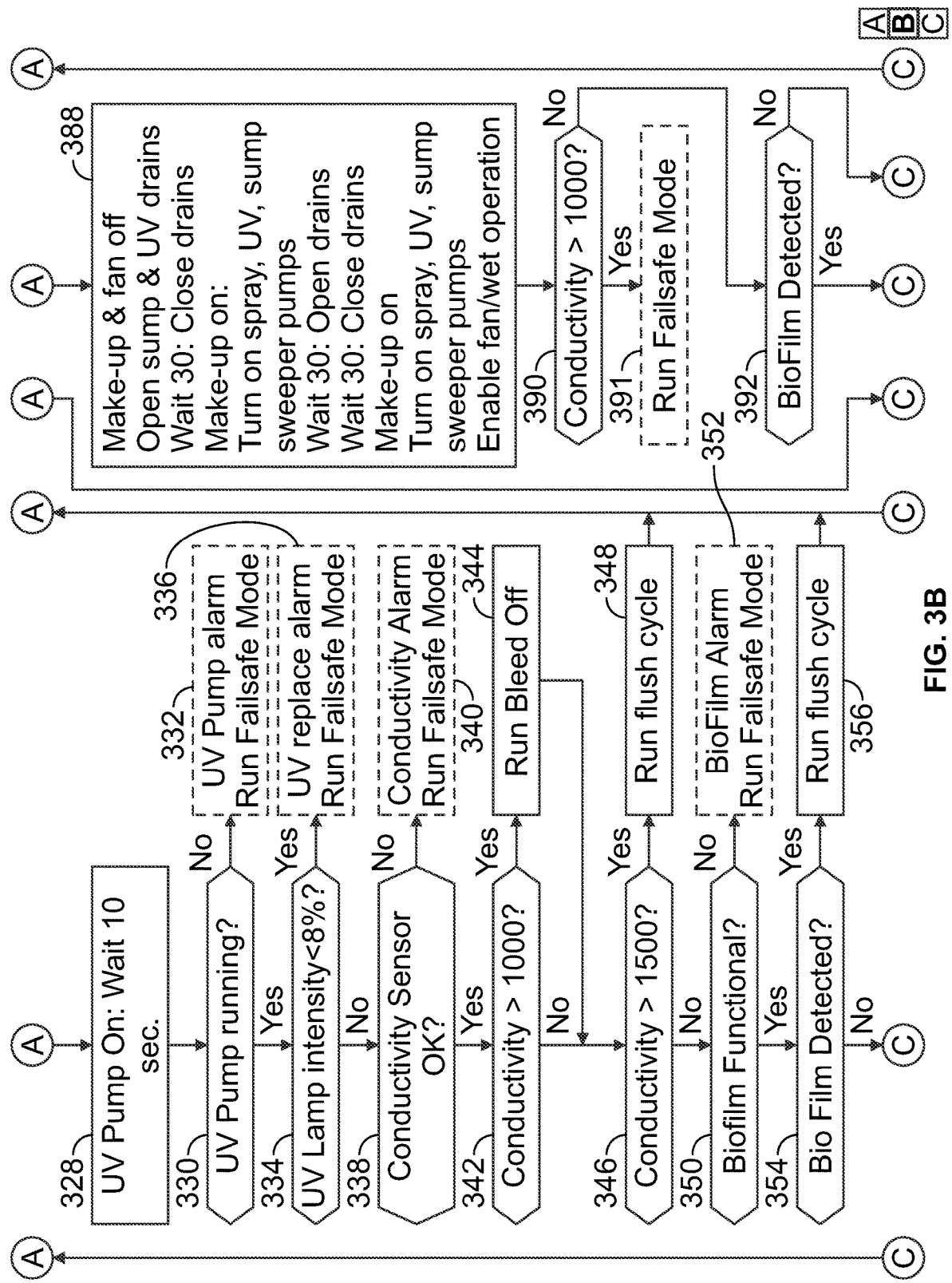
Figure 3C:
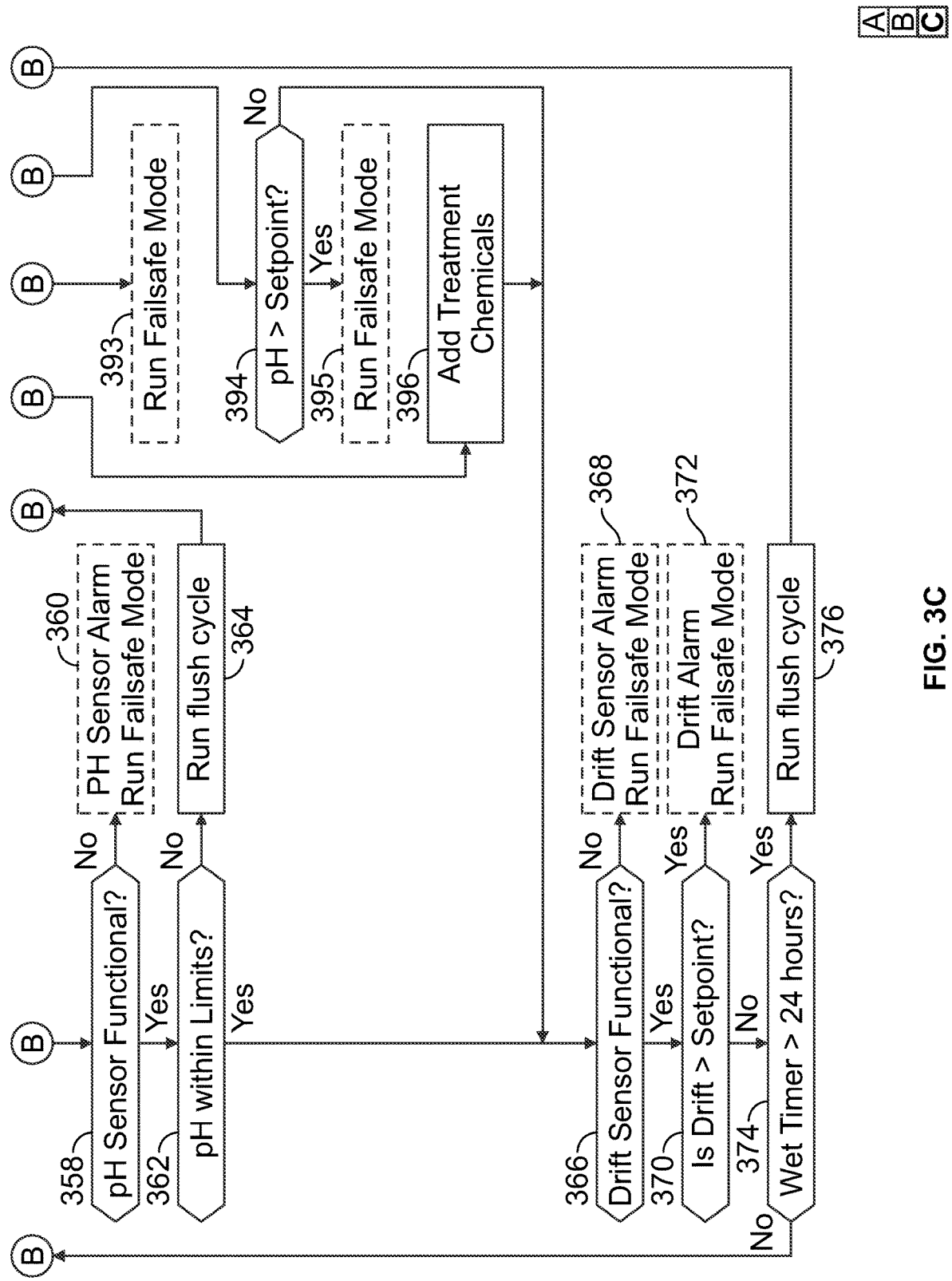
Figure 4A:
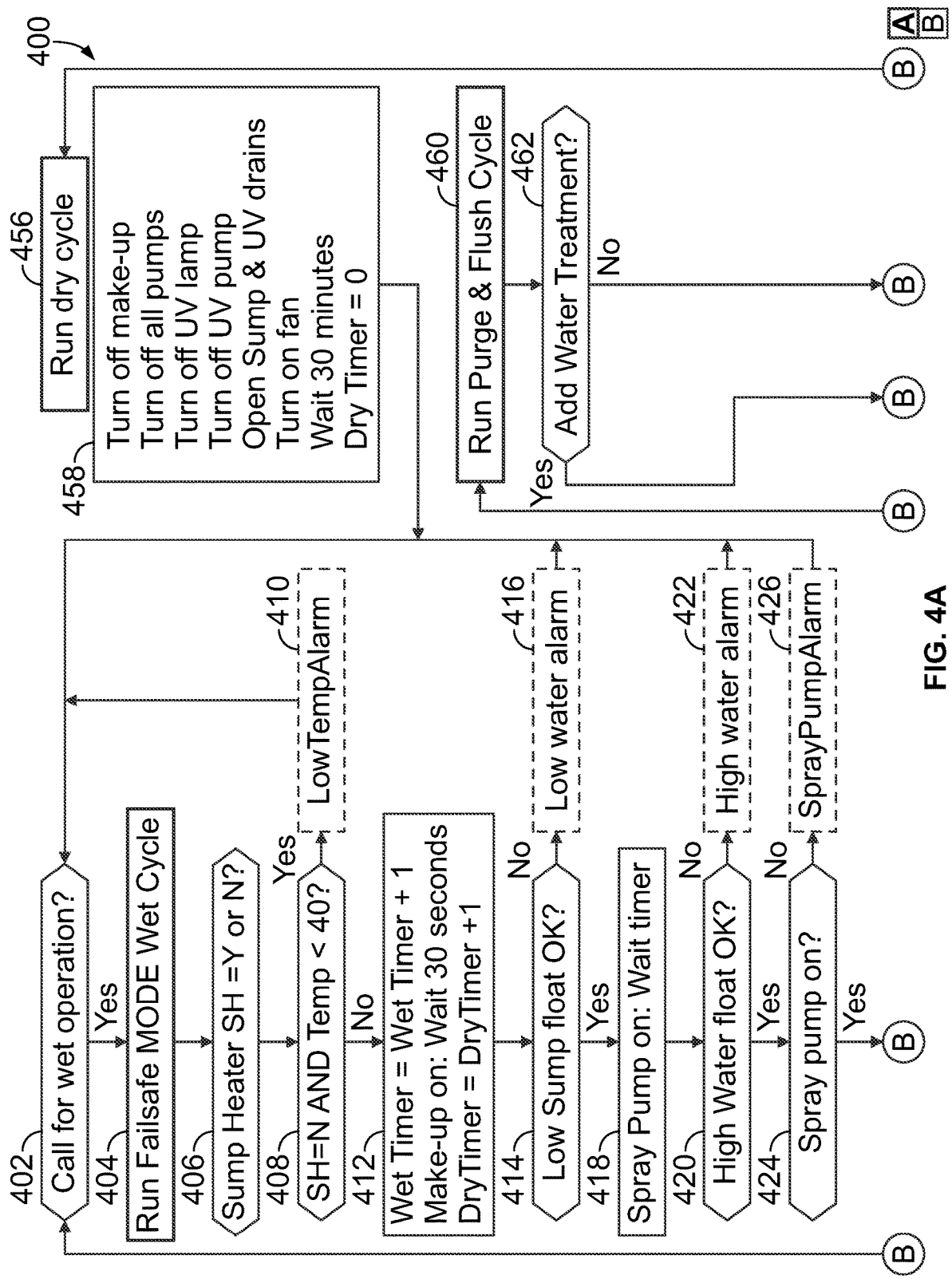
FIGS. 4A and 4B provide a control logic diagram in accordance with a failsafe operating mode of a controller of a cooling tower.
Figure 4B:
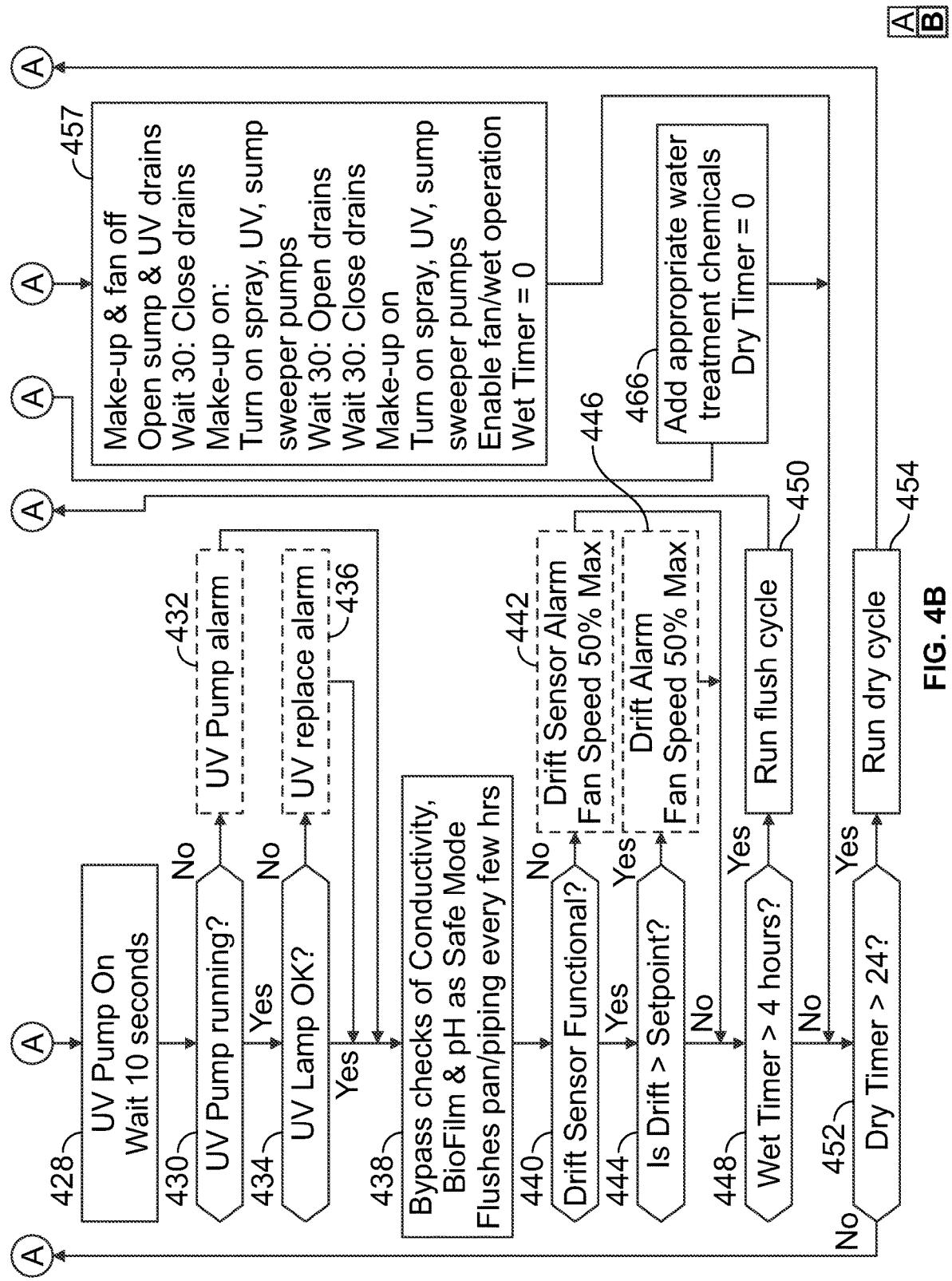

The controller 52 has a normal operating mode 300 utilizing the control logic of FIG. 3A-3C and a failsafe operating mode 400 utilizing the control logic of FIG. 4A-4B. The controller 52 is in the normal operating mode 300 when all the sensors and equipment are operating correctly and the water quality parameters are all within a tolerance of allowable operating ranges. If a water quality upset condition occurs, such as a parameter of the water falling outside the acceptable range, the controller 52 and/or a remote computing device makes a determination of inadequate evaporative liquid quality. The controller 52, in the normal operating mode, will take several attempts to clear up the upset condition. The attempts to correct the upset water quality condition may include, for example, a purge and flush cycle, a clean and disinfect cycle, or a combination thereof as described below. If, after a prescribed number of attempts to correct the water quality issue have been performed and the measured water quality parameters remain in an unacceptable range, or if any of the sensors fail, the controller 52 switches to the failsafe mode.

The failsafe mode keeps the cooling tower water and environment in a safer condition until service personnel arrive. If any of the sensors of the cooling tower 20 are not reading in an acceptable range, or are interpreted by the controller 52 to be in a faulty condition, the controller 52 sends a notification such as an alarm to a remote computing device and controller 52 switches to the failsafe mode which is described in further detail with respect to FIG. 4. The controller 52 may send the alarm to, for example, a HVAC system, a server computer, a service provider, and/or a user device. The alarm may be in the form of an email, an application notification, and/or an SMS message as some examples.

In one embodiment, the controller 52 assigns different weights to different evaporative liquid parameters and addresses deviation in the evaporative liquid parameters differently. For example, the controller 52 may enter the failsafe operating mode 400 in response to the controller 52 determining a biofilm parameter in excess of a threshold. By contrast, the controller 52 may not enter the failsafe operating mode 400 in response to the controller 52 determining the pH of the evaporative liquid is beyond a threshold. Instead, the controller 52 communicates a warning to a remote device regarding the elevated pH level.

In some embodiments, the controller 52 takes an average of readings of the sensors of the cooling tower 20 to ensure an upset condition is true before making a decision. The controller 52 may utilize machine learning with historical data for the cooling tower 20 and/or other cooling towers to identify thresholds, ranges, and tolerances used in determining whether a current parameter value is unacceptable.

Alternatively or additionally, the controller 52 may compare different evaporative liquid parameters to determine an inadequacy of a given evaporative liquid parameter. For example, before initiating the failsafe operating mode 400 based on an elevated pH level parameter, the controller 52 may consider the elevated pH level parameter in view of a biofilm parameter and a chlorine level parameter of the evaporative liquid. If fewer than all three parameters are outside of acceptable tolerances, the controller 52 may determine the evaporative liquid parameter is adequate for the time being. An occurrence of a similar out-of-tolerance reading after a set period of time may be grounds for the controller 52 to initiate the failsafe operating mode 400.

Referring now to FIGS. 3A-3C, control logic for the normal operating mode 300 is provided. The normal operating mode 300 includes the controller 52 receiving 302 a request or call for cooling and initiates 304 a normal wet evaporative cycle. The controller 52 checks 306 whether the cooling tower 20 includes sump heaters. If there are sump heaters, then the evaporative equipment can typically operate wet regardless of the ambient temperature and proceeds to operation 312. If there are not sump heaters, then controller 52 at operation 306 considers the ambient temperature sensed by temperature sensor 54.

The customer or operator can input, such as via a user interface of a HVAC system operably coupled to the cooling tower 20, whether the cooling tower 20 can or cannot be allowed to run in freezing conditions. On some equipment, if the ambient temperature is below freezing (32° F.), the cooling tower 20 is kept from operating in the wet mode to eliminate the possibility of freezing and instead operates in the dry mode. The controller 52 communicates a low temperature alarm 310 to a remote device, such as a HVAC system or a user smartphone, upon the cooling tower 20 not having sump heaters and the ambient temperature being below a predetermined temperature such as 40° F. Alternatively or additionally, the controller 52 may monitor the temperature sensor 54A in the spray water pipe and as long as the spray water temperature remains above a preset level, typically 45 to 50 F, then it is safe to operate the cooling tower in the wet mode.

Referring again to FIG. 3A, the controller 52 at operation 312 monitors a wet timer to keep track of how many hours the cooling tower 20 has operated in the wet mode. One reason to keep track of time the cooling tower 20 has operated in the wet mode is because the controller 52 is programmed so that at a select interval of time, a changeable parameter, typically after operating wet for 24 hours, the cooling tower 20 can be run through a purge and flush cycle to reduce the risk of microbial contamination at a time that is convenient for the operator of the cooling tower 20.

The configuration of the unit plays a role in allowing a purge and flush cycle without wasting a large volume of water. While a flush cycle can be used on any size evaporative heat transfer equipment, for some applications it is advantageous to have as small of a sump as possible. The sump may be less than half the size of the footprint of the cooling tower footprint to minimize water usage.

Referring to FIG. 2, the sump 39 is smaller, for example, less than half the size than the footprint of the unit as shown by wall 38. The purpose of the purge and flush cycle is to dispose of built-up solids, debris, contaminants, microbials and biofilms to help keep the tower sump floor and walls clean and to reduce microbial contamination. The controller 52 may perform a purge and flush cycle once daily (or after 24 hours of wet operation) while the controller 52 is in the normal operating mode 300. When the controller 52 is operating in the failsafe operating mode 400, the controller 52 will run purge and flush cycles more frequently because when operating in the failsafe operating mode, the controller 52 has determined that there is an upset condition that could not be corrected under normal operation mode and the controller 52 communicates a notification that the unit needs to be serviced. Further details regarding operation of the failsafe operating mode are discussed below.

Referring again to FIG. 3A, once the wet mode is on, the controller 52 turns on the make-up water and starts a fill timer at operation 312. The controller 52 determines 314 whether the sump water has reached a minimum level as detected by a float sensor in the sump within a certain period as determined by the fill timer, and if the sump 39 is not filled within the maximum allowable fill time (which may be an adjustable parameter), then the controller 52 communicates 316 a low sump water alarm. The controller 52 refrains from operating the cooling tower 20 in the wet mode and waits for the make-up assembly to be repaired and the alarm to be reset. If, however, the sump float detects the sump water level is high enough, the controller 52 energizes the spray pump 19 and a spray pump start timer is energized at operation 318. After the spray pump time period ends, the controller 52 checks 320 whether the sump water has reached a predetermined level based on a sump float sensor 47. If the sump water has exceeded the predetermined maximum level at operation 320, the controller 52 communicates 322 a high sump water level alarm.

The controller 52 determines 324 whether the spray pump 19 is on. The determining 324 may include, for example, checking whether a spray pump switch detects there is water flowing downstream of the spray pump 19. If the spray pump switch 49 (see FIG. 2) does not detect water flow, the controller 52 communicates 326 a spray pump alarm. In one embodiment, the controller 52 is not operable in the normal operating mode 300 after one or more alarm communications (e.g., communications 310, 316, 322, 326) until the alarm(s) is cleared and the issue is repaired. The controller 52 operates the cooling tower 20 in the dry mode until the issue is repaired.

Once the controller 52 determines the spray pump 19 is operating, the controller 52 starts the UV pump 41 and waits a predetermined time period such as ten seconds at operation 328. At the end of the time period, the controller 52 determines 330 whether the UV pump 41 is running such as by checking whether a UV pump switch detects water flowing through the UV side stream loop 97. If the controller 52 determines 330 that the UV pump is not running, the controller 52 communicates 332 a UV pump alarm, turns off the UV lamp, and enters the failsafe operating mode 400.

It is noted that there are different methods to prove the spray pump or UV pumps are pumping such as a flow switch, differential pressure switch, and/or a current sensor. It is also noted that once the sump float switch determines there is water in the sump 39, in one embodiment the UV pump will always run to continually reduce microbial content in the sump water until such time that the float switch detects there is low or no water in the sump. This also allows continuous monitoring of all the water qualify parameters. Once the UV pump flow switch 41C detects water flow in the side stream water loop, controller 52 checks 334 an intensity sensor of the UV lamp. If the UV lamp has lost intensity past a minimum effective value (e.g., 8%), meaning that the lamp needs to be cleaned or is not working properly, then the controller 52 communicates 336 a UV bulb replacement alarm and the controller 52 changes from the normal operating mode 300 to the failsafe operating mode 400.

Referring again to FIG. 3B, normally, once the controller 52 determines the UV lamp intensity to be acceptable at operation 334, the controller 52 checks 338 whether the conductivity sensor 51 is operable. The controller 52 communicates 340 a conductivity alarm and enters the failsafe mode upon the conductivity sensor 51 not being operable.

If the conductivity sensor 51 is operable, the controller 52 determines 342 whether the conductivity of the sump water is greater than a predetermined level such as 1,000 micromhos per centimeter. The conductivity levels utilized at operations 342 and 346 may be programmed into the controller 52 by a user. Cooling tower bleed-off is used to keep the level of dissolved solids within acceptable range as when water evaporates, solids contained in the water are left behind. The evaporative liquid treatment system 27 of the cooling tower 20 may include a chemical treatment system 99 that, in addition to adding chemicals into the water, takes primary responsibility for bleeding off water from the sump 39. The chemical treatment system 99 may add solid or liquid chemicals to the water. Example chemicals include chlorine, bromine, halogen tablets, a corrosion inhibitor, a scaling inhibitor, and/or a non-oxidizing biocide. The chemical treatment system 99 may include, for example, a floating feeder and/or a brominator with a separate recirculating pump.

Should the bleed-off function of the chemical treatment system 99 not operate correctly, controller 52 in the normal mode operates as a secondary control and functions as back-up bleed off by bleeding water the sump 39 as needed. This helps to assure that the cooling tower can continue to run without the solids running out of control until the next service visit. So, as an example, the chemical treatment system 99 may open the bleed-off at 1,000 micromhos per centimeter and close the bleed-off at say 800 micromhos per centimeter. This differential can help assure a small amount of water is bled off while the makeup replaces the water that is bled off. Of course, these values can be changed to suit the needs of the installation.

Continuing with the example, back-up conductivity set points for the controller 52 are set at 1200 micromhos per centimeter bleed-off on and 1000 micromhos per centimeter off and the next set point is set at 1500 micromhos per centimeter on and 1000 micromhos per centimeter off. Thus, when controller 52 sees the conductivity of the water cross the 1200 conductivity point, in the normal operating mode the controller 52 performs 344 a bleed off operation by opening the drain valve 48 of the sump 39 for a calibrated time period to prevent the spray pump from turning off. The open drain valve 48 drains water from the sump 39 and the make-up float valve assembly 34 will automatically fill the sump back up. Alternatively or additionally, the controller 52 may decide to open the drain valve 48 to bleed off water based on the load and/or the time of day. In one embodiment, the drain valve 48 can be proportionally controlled to allow a small amount of water to be bled off or a separate bleed off valve, not shown, can be installed, for example.

If, during the normal operating mode the water conductivity falls below 1,000 micromhos per centimeter, then the drain valve 48 will be closed and controller 52 allows the chemical treatment system 99 to control bleed off provided by the sump drain valve 48. If, however, the conductivity value continues to rise about the second controller high set point, 1500 in this example, then in the normal operating mode controller 52 takes control of the sump drain valve 48 and initiates 348 a purge-flush cycle 384, which purges or drains all the sump water then refills the sump water. The purge and flush cycle 384 should immediately bring the solids content below the 1,000 setting with proper differentials on each setpoint.

It should be noted that, in some embodiments, the cooling tower 20 includes a sump sweeper system including a pump and piping. The sump sweeper system can run as part of the purge and flush cycle 384 to assist in churning the solids and any bioactivity to be purged from the cooling tower. If after a set amount of purge and flushes the conductivity remains high, a high conductivity alarm is sent and controller 52 switches to the failsafe operating mode 400 which is described below. In addition, there is feedback from the conductivity sensor itself at operation 338. If the feedback is that the conductivity sensor has malfunctioned or is not working, then a conductivity sensor failure alarm is sent and controller 52 changes the unit's operation from the normal operating mode to the failsafe operating mode.

Referring again to FIG. 3B, once the conductivity is within acceptable limits, controller 52 determines 350 whether the biofilm sensor 51 is operable. If not, the controller 52 communicates 352 a biofilm alarm and enters the failsafe mode.

If the biofilm sensor 51 is operable, the controller 52 determines 354 whether there is any bioactivity or any biofilms forming in sump 39. If bioactivity or a biofilm is detected, then the controller 52 in the normal operating mode initiates 356 the purge and flush cycle 384 which is run to clean out the bioactivity or biofilm in the sump water by flushing the sump 39 and associated water touch components. Alternatively or additionally to the purge-flush cycle 384, the controller 52 may direct an emergency supply of shocking chemical to the cooling tower sump. As an example, if the chemical treatment system 99 provides chlorine or other chemicals to control bacterial growth and the chemical is depleted or their system fails to add the chemicals, the controller 52 in the normal operating mode 300 can act as a back-up system to reduce the risk of microbial contamination by either adding emergency chemicals the cooling tower sump 39 to clean and disinfect or can purge and flush the sump water containing components, or both, until such time that service personnel arrive to fix the upset condition. It should be noted that a biofilm alarm is sent and the controller 52 changes from the normal operating mode 300 to the failsafe operating mode 400 after a number of purge and flush cycles, and after adding emergency supply of chemicals, if the bioactivity or biofilm is still detected. In addition, there is a feedback at operations 350 from the bioactivity and/or biofilm sensor itself. If the feedback is that the sensor has malfunctioned or is not working, a biofilm sensor alarm is sent and the controller 52 changes from normal operating mode 300 to failsafe operating mode 400.

Referring again to FIG. 3C, once bioactivity or biofilm is not detected above acceptable setpoint levels, next the controller 52 checks 358 whether the pH sensor 39B is operable. If not, the controller 52 communicates 360 a pH sensor alarm and enters the failsafe operating mode 400.

If the pH sensor 39B is operable, the controller 52 determines 362 whether the pH level in the water is acceptable such as being within a predetermined range. If the value of pH is not acceptable, controller 52 can either add emergency back-up chemicals and/or activate 364 the purge and flush cycle 386 depending on the water quality of the make-up water and a manual input.

As an example, if the incoming make-up pH is not within acceptable limits and chemicals are needed to be added to control the pH level, a manual input to the controller 52 identified at operation 386 causes the controller 52 to direct the chemical treatment system 99 to add chemicals at operation 396 instead of performing purge and flush operations 388 to control the pH. Thus, during the normal operating mode, the controller 52 will act as a back-up for the way the chemical treatment system 99 would maintain the pH level.

The controller 52 sends a pH alarm and activates the failsafe operating mode 400 if a certain number of purge and flush cycles are attempted or chemicals are added in an attempt to bring the cooling tower water back into the acceptable pH range during the normal operating mode. In addition, there is a feedback from the pH sensor itself at operation 358. It will be appreciated that, in some embodiments, an unacceptable pH parameter by itself is insufficient to cause the controller 52 to enter the failsafe operation mode 400. If the feedback is that the pH sensor has malfunctioned or is not working, a pH sensor alarm is sent and the controller 52 changes the controller 52 from normal operating mode 300 to failsafe operating mode 400 at operation 360.

Referring to FIG. 3C, the controller 52 receives feedback from the drift sensor 40 and determines 366 whether the drift sensor 40 is functional. The drift sensor 40 is configured to detect if there is an unacceptably high amount of drift. Drift is defined as water droplets or aerosol leaving the cooling tower 20. As most cooling towers are designed to have a minimal amount of drift, there are a few upset conditions where drifting can occur such as in extreme wind conditions, when the cooling tower fill becomes damaged, the cooling tower eliminators are damaged or dislodged, or when a water distributing nozzle is dislodged or breaks. While these conditions are rare, this application describes techniques for controlling the cooling tower 20 to limit drift during these upset conditions while keeping the cooling tower 20 running. If the drift sensor 40 detects an unacceptable amount of drift, the controller 52 in the normal operating mode will attempt to reduce the drift rate in order to reduce the risk of microbial contamination to the environment. If the drift rate is not within proper limit and the degree of bioactivity or biofilm content is also high, then depending on the manual inputs, the controller 52 may shut the cooling tower down until service is performed to prevent microbial contamination to the nearby environment. If the drift is detected as being too high in the normal operating mode, the controller 52 will attempt to correct or reduce the drift rate if that was the preference input in the manual data. The controller 52 may also switch to a lower fan speed, shut the unit down, or switch to dry operation depending on the manual inputs and system requirements. For example, on multi-cooling tower installations, if one cooling tower has a drift issue, the decision can be made to turn the cooling tower off and call for service if the other cooling towers can handle the load. If, however, the customer needs to continue operating the cooling tower until such time that service personnel arrive, the controller 52 will decide to lower the fan speed to a level that is known to be where drift cannot occur, typically 50% fan speed, and the controller 52 communicates 372 a drift alarm and changes the unit's operation from the normal operating mode to the failsafe operating mode. In addition, there is a feedback from the drift sensor 40 itself. If the controller 52 determines 366 that the drift sensor 40 has malfunctioned or is not working, controller 52 changes the unit's operation from the normal operating mode to the failsafe operating mode 400 and communicates a drift sensor alarm at operation 368.

Referring to FIG. 2, the plume sensor 55 is configured to detect 373 if there is an unacceptable rate of plume leaving the cooling tower as desired by certain customers. In some applications, plume is not desired because either the plume can be interpreted as an unsafe condition, the plume can block vision at an airport for example, the plume can freeze, or the plume can impinge on the surrounding buildings or structures and is therefore undesirable. Accordingly, some cooling tower customers ask that plume is limited or completely avoided. Cooling towers for these applications are typically equipped to abate plume. If plume sensor 55 detects 373 the plume is too high, then controller 52 will change unit operating parameters to reduce or eliminate the plume, such as adding heat from a waste heat source or other heat source. If after the adjustments an unacceptable amount of plume is still detected, controller 52 communicates 375 a plume alarm and changes the controller 52 from the normal operating to failsafe operating mode. In addition, there is a feedback from the plume sensor 55 itself. If the controller 52 determines 377 is that the plume sensor 55 has malfunctioned or is not working, controller 52 changes 379 the from the normal operating mode 300 to the failsafe operating mode 400 and sends a plume sensor alarm.

After the safety checks on the sump water system and cooling tower operation are completed, the controller 52 checks 374 whether the cooling tower 20 has operated above the wet timer setpoint which under normal conditions is typically set to 8 to 24 wet running hours. If the cooling tower 20 has run greater than the manually inputted wet time period, then controller 52 initiates 376 the purge and flush cycle 384. The purge and flush cycle 384 may be set according to a user manual input (see FIGS. 5A and 5B).

The purge and flush cycle 384 includes the controller 52 directing operations 388 (FIG. 3B) if treatment chemicals are not added at operation 386. The operations 388 include turning off spray pump(s), turning off UV pumps, turning off UV light(s), closing the make-up water valve 56, turning off the fan motor 25, opening the sump drain valve 48, and opening a drain 41A associated with the UV light 42. The operations 388 further include waiting a first predetermined time period, such as 30 seconds, followed by closing the drains. Next, the make-up water valve 56 is opened and the spray pump 19, UV pump 41, and sump sweeper pump 39A (if equipped) are turned on. The controller runs the flush cycle and waits a second predetermined time period, such as 30 seconds, before again initiating a purge cycle including turning off spray pump(s), turning off UV pumps, turning off UV lights, closing the make-up water valve 56, turning off the fan motor 25, opening the sump drain valve 48, and opening a drain 41A associated with the UV light 42. The controller 52 waits a third predetermined time period, such as 30 seconds, before closing the sump drain valve 48 and UV pump drain 41A. The make-up water valve 56 is opened and the sump pump 19, UV pump 41, and sump sweeper pump 39A are turned on. In some embodiments, the sump sweeper pump 39 is connected to a filter or cyclonic separator which has their own flush cycle that may be controlled by controller 52. The operations 388 conclude with enabling operation of the fan 26 and wet operation of the cooling tower 20.

If after running the purge and flush cycle 384, any of the conductivity, biofilm or pH levels are not as expected as determined at operations 390, 392, 394, one or more alarms are sent and the controller 52 changes from the normal operating mode 300 to the failsafe operating mode 400 at operations 391, 393, 395. After the purge and flush cycle 384, the controller 52 also looks at the dry run timer and will initiate 380 a dry cycle 382 when the duration of the dry run timer is above that manually inputted dry run timer period. The purpose of the dry cycle is to purge the sump water and run the fan 26 so that the sump 39 dries out for a manually inputted specified period to inhibit microbial contamination because many microbes will die once they are dry. Once the dry cycle 322 is complete, the system loops back to the beginning of the normal operating mode 300.

Another feature of the control logic of the normal operating mode 300 is the ability of the controller 52 to detect when there is an upset condition, send the appropriate alarm, and switch from the normal operating mode 300 to the failsafe operating mode 400. Controller 52 continuously monitors cooling tower water quality parameters including but not limited to at least one of: conductivity level, existence of a bioactivity or a biofilm, pH level, excessive plume, and cooling tower drift. The controller 52 also continuously monitors the following: ambient temperature, spray water temperature, sump water level, spray pump operation, UV pump operation, UV lamp intensity on make-up and/or bypass loop, conductivity sensor, biofilm detection sensor, pH level sensor, plume sensor, and drift detection sensor.

The controller 52 operates in the failsafe operating mode 400 should one or more of the sensors fail or after an attempt to bring the water quality back into the acceptable operating range such as after adding chemicals or activating a prescribed number of water purge and flush cycles 460 (see FIG. 4). During the purge and flush cycle operations 464, the cooling tower water is purged then refilled with fresh water, then the water sump, water distribution system and evaporative heat exchangers are flushed. In some embodiments, the chemical treatment system 99 adds chemicals to the newly filled sump water after the water has been purged to aid in cleaning, flushing and disinfecting the water contact components. In one embodiment, the failsafe operating mode 400 increases the frequency of purge and flush cycles 464 as compared to the purge and flush cycles 384 during the normal operating mode 300 to keep the water quality parameters safer until the cooling tower 20 is properly serviced and the alarms are reset.

As an example, in some prior art cooling towers that employ a conductivity sensor, the conductivity sensor measures the solids content in the water and the cooling tower opens the bleed off until the conductivity sensor reads an acceptable value. But if, after a certain time period, the conductivity does not drop below an acceptable value or if the solids content continue to rise, an alarm for service is turned on but there is no provision to continue operating the tower in a safer condition until the service is completed. To address this issue, and to keep the solids from running to a level which creates extreme heat exchanger fouling and loss of cooling tower capacity, the cooling tower 20 and control logic in FIGS. 3A-3C and 4A-4B cause the unit to automatically purge then flush out the sump by turning on the purge and flush cycle 384, 460 without wasting a large amount of water. It is worth noting that a small design for the sump 39 can help reduce water consumption during the purge and flush cycle. If after attempting to purge, flush, and disinfect the sump water and the conductivity remains high, controller 52 switches to the failsafe operating mode 400. In one approach, the manual inputs 500 (see FIGS. 5A and 5B) include an instruction to shut down the cooling tower 20 in such a situation. The cooling tower water would then be drained and the cooling tower 20 turned off until service personnel service the cooling tower 20 and resent the alarms.

As another example, in some prior art cooling towers that employ a pH sensor, that sensor would measure the pH and add chemicals to try to maintain the proper pH levels. But if, after a certain time period the pH does not get to an acceptable value, other than turning on an alarm for service, there is no provision to continue operating the tower in a safer condition until service is completed. To address this issue and to keep the cooling tower from running at extremely unsafe and potentially corrosive pH levels, the cooling tower 20 and control logic in FIGS. 3A-3C and 4A-4B cause the cooling tower 20 to automatically purge then flush out the sump 39 and to bring in fresh water to get the pH level under control. If after attempting to clean out the sump the pH remains at an unacceptable level, or if the pH sensor 46 fails to operate, a pH alarm is sent and the controller 52 switches to the failsafe operating mode. In one approach, the manual inputs 500 (see FIGS. 5A and 5B) include an instruction to shut down the cooling tower 20 in such a situation. The cooling tower water is then drained and the cooling tower 20 turned off until service personnel service the cooling tower 20 and resent the alarms.

In another example of a benefit provided by the cooling tower 20, a contractor may from time to time add very acidic chemicals into the basin with the hopes of descaling the indirect heat exchanger. However, if not properly administered, the cooling tower water can be left with extremely corrosive pH levels. Under this extreme upset condition, controller 52 can be configured to continue to call for purge and flush cycles in an attempt to correct the situation and after a certain amount of purge and flush cycle attempts, if the pH level remained out of a safe operating condition, the controller 52 would send a pH alarm and activate the failsafe mode. In one approach, the manual inputs 500 (see FIGS. 5A and 5B) include an instruction to shut down the cooling tower 20 in such a situation. The cooling tower water would be drained and the cooling tower 20 turned off until service personnel service the cooling tower 20 and resent the alarms.

As another example, in some prior art cooling tower applications employing a side stream of sump water with a UV light, or with a UV light installed on the make-up water line or in the sump, or both, the UV light will continue to kill bacteria as long as the UV lamp is clean and is operating at an acceptable intensity level. But if the UV lamp becomes dirty or nonoperational, other than sending an alarm for service, there is no provision to continue operating the cooling tower in a safer condition until service is completed. To address this issue and to reduce microbial contamination, the cooling tower 20 and control logic in FIGS. 3A-3C and 4A-4B, the controller 52 switches to the failsafe operating mode when the UV light is nonoperational or needs to be cleaned. In the failsafe operating mode, the sump 39 may be purged and flushed at a much higher rate and/or antimicrobial chemicals are added to reduce the chance of microbial contamination until service is completed on the cooling tower 20 and the alarms are reset.

In some embodiments, users can provide water quality parameters to the controller 52 using a user interface of the cooling tower 20 or a remote device in communication therewith. The water quality parameters may include cooling tower conductivity, pH, bioactivity, biofilm, drift, and plume. The water quality parameters may be determined from testing with manual instrumentation. The manual inputs may be considered in the control logic in the same manner as if the water quality parameters had been autonomously gathered by the sensors of the cooling tower 20. One advantage of the control logic of FIGS. 3A-3C and 4A-4B is that the control logic keeps the cooling tower 20 and environment safe by first trying to clean out the sump 39 automatically but then switching to a failsafe operating mode 400 once any problem is detected that could not be repaired under the normal operating mode 300.

As another example, in prior art cooling tower applications, occasionally a make-up valve or solenoid fill valve will stick wide open causing an excessive amount of water to be wasted. While some prior art cooling towers are equipped with a high-water level alarm, there is no provision to save water. In both the normal operating mode 300 and the failsafe operating mode 400, should a high water level be detected and depending on the manual inputs 500, while an alarm is communicated at operations 322 and 422, in additional there is an option to turn off the water supply to the cooling tower 20 through an independent electrically operated emergency water valve 56 which will still allow dry operation if so equipped but has the potential to conserve water that otherwise would be continuously drained from the sump 39 via a cooling tower overflow valve.

As noted in FIG. 3A, during the purge and flush cycle 384, the make-up water is turned off, the spray pump 19 is turned off, the UV lamps 42, 42A and UV pump 41 are turned off, the sump drain valve 48 is opened, and the UV pump drain 41A is opened allowing all the water in the cooling tower 20 to be purged. In operation 388, the controller 52 sets a timer utilizing a time period (e.g., 30 seconds) determined by the controller 52, or entered by a user, to permit the water to fully drain from the cooling tower. Then, the sump drain valve 48 and the UV pump drains 41A are closed, and the make-up is turned back on allowing fresh water to fill the sump 39 and associated piping. Once a minimum water level is detected in the sump 39, such as the controller 52 detecting make-up float valve assembly 34 closing, the spray water pump and UV pumps are turned back on which circulates fresh water to scrub and clean the surfaces within the sump 39 and water-contacting surfaces of the spray water distribution system 22 and serpentine tube heat exchangers 23 which helps to scrubs away any solids, debris, contamination, and microbes which may have accumulated. In another embodiment, the controller 52 detects the minimum water level via an electronic water level sensor.

In one embodiment, the cooling tower 20 may be equipped with a two-speed or variable speed spray pump 19. The controller 52 operates the spray pump 19 at the low speed for water recirculation during a wet evaporation mode of the cooling tower 20 and the controller 52 operates the spray pump 19 at a high speed during the purge and flush cycle 384, 460. This allows higher water flow rates to have more scrubbing action during the purge and flush cycles 384, 460. If so equipped, the fan 25 is typically stopped or run at a low speed to limit drift from occurring when the spray pump 19 is operated at high speed to flush out the water touched components.

After a purge and flush cycle 384, 460, the water may be used immediately if the water quality is sensed as being in the acceptable range or after having run a few minutes. If the water quality is still not in the acceptable range, the water is purged again then the process starts over again. The number of purge and flush cycles 384, 460 in the flush cycle mode is an adjustable parameter that can be manually set depending on environmental conditions as well as make-up water quality.

Another feature of the control logic of the normal operating mode 300 is having the ability to continue to run the cooling tower 20 in the wet evaporation mode during the purge and flush cycle 384. This operability is set by a manual input so if the user has selected to keep the cooling tower 20 operating during the purge and flush cycle 384, as maintaining fluid setpoint is paramount, the normal operating mode 300 will keep the fan 25 running. By the time the serpentine tube heat exchangers 23 starts to dry, the purge and flush cycle 384 is terminated and the water is refilled. Stopping the purge and flush cycle 384 after a time period and before the serpentine tube heat exchangers 23 fully dry out keeps the evaporative heat exchanger 23 from fouling. The time period may be entered by a user or determined by the controller 52. The time period is based on the configuration of the cooling tower 20 and the time required to refill the sump 39.

Referring now to FIG. 4, the controller 52 failsafe operating mode 400 is activated when a problem with any of the sensors was found or when any of the measured and controlled parameters of the water quality is out of an acceptable range and attempts to correct them during the normal operating mode 300 have failed. One objective of the failsafe operating mode is to keep the cooling tower 20 and the environment safe during an upset condition until service is performed on the cooling tower 20.

Depending on the manual inputs provided to the controller 52, during the failsafe operating mode, the cooling tower 20 may continue to operate, may be operated with limited capacity, can be operated in the dry mode if so equipped or can be shut down.

Referring again to FIG. 4, once controller 52 has determined that the failsafe operating mode is required, on a call 402 for cooling and more specifically, when the cooling tower 20 needs to operate in a wet, evaporative state, the controller 52 initiates 404 the failsafe mode wet cycle and checks 406 to see if there are sump heaters. If there are sump heaters, then the evaporative equipment can usually operate wet regardless of the ambient temperature, but this is a manual input depending on the cooling tower configuration. If there are not sump heaters, then controller 52 considers the ambient temperature sensed by temperature sensor 54.

If the ambient temperature is below freezing and there are no sump heaters, the controller 52 communicates 410 a low temperature alarm and keeps the cooling tower 20 from operating in the wet evaporative mode to eliminate the possibility of freezing. Another option is to monitor the temperature sensor 54A in the spray water pipe or outlet water pipe and as long as the water temperature remains above a preset level, typically 45° F. to 50° F., then it is safe to operate the cooling tower 20 in the wet evaporative mode.

Referring again to FIG. 4, once controller 52 will allow the cooling tower to operate in the wet mode, the controller 52 performs operation 412 that includes the controller 52 monitoring a wet timer to keep track of the time the cooling tower 20 has operated in the wet evaporative mode. The controller 52 keeps track of the time the cooling tower 20 has operated in the wet evaporative mode because the controller 52 runs a purge and flush cycle at a select interval of time (a changeable parameter), typically after operating wet for 4 hours in the failsafe operating mode. The purge and flush cycle will occur more often in the failsafe operating mode then the normal operating mode to keep the cooling tower and environment safe until service can be performed on the cooling tower 20.

In operation 412, the make-up water is turned on and a fill timer is started. If the controller 52 determines 414 the sump water has not reached a minimum level within the time period set by the fill timer, then a low water alarm is communicated 416, and the controller 52 waits for the make-up assembly to be repaired. If the controller 52 determines 414 the water level is high enough via closing of the make-up float valve assembly 34, the spray pump 19 is turned on and a spray pump start timer is started 318.

After the spray pump time period ends, the controller 52 determines 320 whether the water level exceeds a maximum level via the sump float sensor 47 and determines 324 whether the spray pump 19 is on via, for example, a spray pump switch. The controller 52 communicates 322, 326 corresponding alarms if the water level is too high or the spray pump 19 is inoperable. In the failsafe operating mode, wet evaporative operation of the cooling tower 20 may not be permitted according to the manual inputs 500 until any alarms are cleared and the relevant components repaired.

If the controller 52 determines 324 the spray pump 19 is on, the controller 52 turns on the UV pump 330 and starts a UV timer to measure a UV time period such as 10 seconds. Once the UV time period ends, the controller 52 determines 330 whether the UV pump 41 is running such as via a UV flow switch. If the UV flow switch does not detect water flowing from the UV pump 41, the controller 52 communicates 432 a UV pump alarm, and the UV lamp 42A is turned off to keep the loop from overheating due to lack of flow. Various approaches may be used to detect the spray pump 19 and UV pump 41 are pumping such as a flow switch, differential pressure switch, and/or a current sensor. Once the sump float sensor 47 determines there is water in the sump 39, the UV pump may run continuously until such time that the sump float sensor 47 detects there is no water in the sump 39. This allows continuous monitoring of some or all of the water quality parameters. If the UV pump flow switch 41C detects water flow in the side stream water loop, controller 52 looks at the intensity sensor 43 of the UV lamp 42. If the UV lamp 42 has lost intensity past a minimum effective value, meaning that the UV lamp 42 needs to be cleaned or is not working, then the controller 52 communicates 436 a UV lamp alarm.

In the failsafe operating mode, controller 52 in one embodiment performs operation 438 wherein the controller 52 ignores data from the conductivity, biofilm, and/or pH sensors because in the failsafe operating mode 400, a service call has already been requested by the controller 52 communicating an alarm and the failsafe operating mode 400 purging and flushing the water at a much higher frequency than in normal operating mode 300. In FIG. 4, the failsafe operating mode is shown bypassing considering data from these sensors, but the ability of the controller 52 to bypass consideration of the data from the conductivity, biofilm, and pH sensors is set by a manual input from a user.

Next controller 52 receives feedback from the drift sensor 40 and determines 440 whether the drift sensor 40 is operating. If the feedback is that the drift sensor has malfunctioned or is not working, controller 52 communicates 442 a drift sensor alarm and may adjust a fan speed at operation 442, such as by limiting the speed of the fan 25 to 50% of the maximum fan speed.

If the drift sensor 40 is operating, the controller 52 determines 444 whether the measured drift is above a threshold. The drift sensor 40 detects if there is an unsafe amount of drift which contains water droplets or mist that are leaving the cooling tower 20 in order to reduce the risk of microbial contamination to the surrounding environment. If the drift is determined 444 as being above an acceptable parameter and depending on the bioactivity parameter sensed by the bioactivity sensor, the controller 52 communicates 446 a drift sensor alarm and may adjust the fan speed at operation 446. The controller 52 may adjust the fan speed to a level that is known to be where drift is within tolerance, or the controller may turn off the fan or operate in the dry mode depending on the customer manual inputs and the controller 52.

After the safety checks on the sump water system and cooling tower operation of operations 408, 414, 420, 424, 430, 434, 440, and 444 are completed, controller 52 determines 448 whether the cooling tower 20 has operated for longer than the wet timer setpoint which, in the failsafe operating mode 400, may be set to four wet running hours as an example. If the unit has run longer than the wet timer setpoint, then controller 52 will initiate 450 the purge and flush cycle 460. After the purge and flush cycle 460, the controller 520 also determines 448 whether the dry run timer has exceeded a dry run timer setpoint and will initiate 454 a dry cycle 456 when the dry run timer has exceeded the dry run timer setpoint. The dry cycle 456 includes operations 457 is to purge the sump water and run the fan so that the sump 39 dries out for a specified period of time in a further attempt to inhibit microbial contamination. Once the dry cycle 456 is complete, the failsafe operating mode 400 loops back to the beginning of the process. The number of dry cycles permitted may be a manual input provided by a user.

Like the purge and flush cycle 384, the controller 52 upon starting the purge and flush cycle 460 may determine 462 whether to direct the chemical treatment system 99 to add chemicals at operation 396 instead of performing purge and flush operations 388. The operation 462 may include the controller 52 making the decision of based on the current unacceptable water parameter and a manual input. For example, if the pH of the water is outside of a first tolerance (causing initiation of the failsafe operating mode 400) but still within a second tolerance, the controller 52 may determine 462 to add water treatment chemicals at operation 466 rather than performing the operations 464 of the purge and flush operations 464.

Although the normal operating mode 300 and the failsafe operating mode 400 are discussed above as a flow of particular operations, it will be appreciated that the order of the operations may be changed, the operations combined or separated, and various operations added or omitted as desired for a particular application. As one example in this regard, the control logic of the modes 300, 400 may utilize two or more related evaporative liquid parameters to make a given determination. For example, the normal operating mode 300 may have an operation wherein if the pH is greater than 10 and the total dissolved solids are outside of a predetermined range, the controller 52 initiates the failsafe operating mode 400. The same operation in the normal operating mode 300 may further specify that if the pH is less than 10 and the total dissolved solids are outside of the predetermined range, the controller 52 remains in the normal operating mode for a set period of time to wait and see whether the normal operation of the cooling tower remedies the out-of-range total dissolved solids parameter.

As discussed above, in some embodiments the controller 52 may utilize various manual inputs as part of the control logic implemented in the normal operating mode 300 and the failsafe operating mode 400. FIGS. 5A and 5B provides includes example manual inputs 500 that may be used as part of the control logic. The manual inputs 500 may include, for example:

Existence of sump heaters?
Minimum ambient temperature for wet operation?
Is cooling tower operable in a dry mode?
Whether to operate in dry mode below freezing ambient temperature?
Minimum allowable spray temperature for wet operation?
Is there a UV system installed on the make-up?
Is there a UV system installed within the tower?
Is there a UV system installed in a side stream?
Shut off water supply when high-water level alarm is present?
During failsafe mode, whether it is preferred to purge and flush more often regardless of water quality sensors?
Is water quality monitored offsite and is that information inputted into the controller?
Does a water treatment system control bleed off?
Is it desired to have the controller operate the bleed off when conductivity is too high?
Conductivity values for water treatment system?
Conductivity values for controller to take over bleed off control?
Minimum effective UV light intensity(s)?
Minimum acceptable bioactivity or biofilm level and differential?
Under upset condition, preference to continue operating unit or shut down?
Is cooling tower equipped with back-up antimicrobial chemicals?
Is adding chemicals more preferred than purge and flush cycles during upset bioactivity condition?
Number of purge and flush cycles before activating failsafe mode?
Proper value of pH and differential?
Is cooling tower equipped with pH controlling chemicals?
pH level of make-up water?
Is adding chemicals more preferred than purge and flush cycles during upset pH condition?
Maximum acceptable drift limit?
Preference to lower fan speed or shut off tower under unacceptable drift conditions?
Maximum acceptable plume rate?
Preference to operate plume abatement system, lower fan speed or shut off tower under unacceptable plume conditions?
Number of flush cycles during normal operating mode?
Number of flush cycles during failsafe operating mode?
Is unit equipped with a high-speed pump to aid in flushing operation?
Are dry cycles desired and at what frequency?
Drain the sump during when demand for cooling is not present?

Uses of singular terms such as "a," "an," are intended to cover both the singular and the plural, unless otherwise indicated herein or clearly contradicted by context. The terms "comprising," "having," "including," and "containing" are to be construed as open-ended terms. It is intended that the phrase "at least one of" as used herein be interpreted in the disjunctive sense. For example, the phrase "at least one of A and B" is intended to encompass A, B, or both A and B.

While there have been illustrated and described particular embodiments of the present invention, it will be appreciated that numerous changes and modifications will occur to those skilled in the art, and it is intended for the present invention to cover all those changes and modifications which fall within the scope of the appended claims. For example, although the control logic of normal and failsafe operating modes 300, 400 are described with reference to cooling tower 20, it will be appreciated that some or all of the normal and failsafe operating modes 300, 400 may be implemented by a control system of the cooling tower 10.

What is claimed is:

1. A cooling tower system comprising:
    a cooling tower comprising:
        an evaporative heat exchanger, the cooling tower operable to distribute an evaporative liquid onto the evaporative heat exchanger;
        a sensor configured to detect a parameter of the evaporative liquid; and
        an evaporative liquid treatment system;
    a controller operably coupled to the cooling tower, the controller having a normal operating mode wherein the controller operates the evaporative liquid treatment system to treat the evaporative liquid upon a determination of inadequate evaporative liquid quality based at least in part on the parameter of the evaporative liquid;
    the sensor operable to detect the parameter of the evaporative liquid after the controller operates the evaporative liquid treatment system;
    the controller configured to determine whether the operation of the evaporative liquid treatment system is unable to remedy the inadequate evaporative liquid quality based at least in part upon the parameter of the evaporative liquid detected after the operation of the evaporative liquid treatment system; and
    the controller having a failsafe operating mode wherein the controller changes operation of the cooling tower upon a determination that the operation of the evaporative liquid treatment system is unable to remedy the inadequate evaporative liquid quality.

2. The cooling tower system of claim 1 wherein the controller, in the normal operating mode, is capable of operating the cooling tower in a plurality of modes including a wet mode wherein the cooling tower distributes the evaporative liquid onto the evaporative heat exchanger and a dry mode wherein the cooling tower limits distribution of the evaporative liquid onto the evaporative heat exchanger; and
    wherein the controller, in the failsafe operating mode, refrains from operating the cooling tower in the wet mode.

3. The cooling tower system of claim 2 wherein the plurality of modes of operation include an adiabatic mode; and
    wherein the controller, in the failsafe operating mode, refrains from operating the cooling tower in the wet mode and the adiabatic mode.

4. A cooling tower system comprising:
    a cooling tower comprising:
        an evaporative heat exchanger, the cooling tower operable to distribute an evaporative liquid onto the evaporative heat exchanger;
        a sensor configured to detect a parameter of the evaporative liquid; and
        an evaporative liquid treatment system;
    a controller operably coupled to the cooling tower, the controller having a normal operating mode wherein the controller operates the evaporative liquid treatment system to treat the evaporative liquid upon a determination of inadequate evaporative liquid quality based at least in part on the parameter of the evaporative liquid;

the controller having a failsafe operating mode wherein the controller changes operation of the cooling tower upon a determination that the operation of the evaporative liquid treatment system is unable to remedy the inadequate evaporative liquid quality;

wherein the controller, in the normal operating mode, is capable of operating the cooling tower in a plurality of modes including a wet mode wherein the cooling tower distributes the evaporative liquid onto the evaporative heat exchanger and a dry mode wherein the cooling tower limits distribution of the evaporative liquid onto the evaporative heat exchanger; and wherein the controller, in the failsafe operating mode, refrains from operating the cooling tower in the wet mode;

wherein the cooling tower includes at least one operating parameter sensor configured to detect an operating parameter of the cooling tower;

the controller is configured to receive a process fluid temperature request and determine whether to operate the cooling tower in the wet mode to satisfy the process fluid temperature request based at least in part on the process fluid temperature request and the operating parameter; and wherein the controller, in the failsafe operating mode, refrains from operating the cooling tower in the wet mode despite the controller determining operation of the cooling tower in the wet mode is appropriate to satisfy the process fluid temperature request.

5. The cooling tower system of claim 1 wherein the evaporative liquid treatment system is operable to purge and flush the cooling tower; and wherein the controller, in the normal operating mode, is configured to periodically cause the evaporative liquid treatment system to purge and flush the cooling tower.

6. The cooling tower system of claim 5 wherein the controller, in the failsafe operating mode, is configured to change the operation of the cooling tower including causing the evaporative treatment system to purge and flush the cooling tower more frequently than with the controller in the normal operating mode.

7. The cooling tower system of claim 1 wherein the controller, in the normal operating mode, is configured to operate the evaporative liquid treatment system including at least one of: opening a makeup liquid supply valve, opening a bleed off valve, running a purge and flush cycle, and adding a treatment chemical to the evaporative liquid; and wherein the controller, in the failsafe operating mode, is configured to change operation of the cooling tower including at least one of turning off a spray pump, reducing a speed of a fan of the cooling tower, running a purge and flush cycle, and adding a treatment chemical to the evaporative liquid.

8. A cooling tower system comprising:

a cooling tower comprising:

an evaporative heat exchanger, the cooling tower operable to distribute an evaporative liquid onto the evaporative heat exchanger;

a sensor configured to detect a parameter of the evaporative liquid; and an evaporative liquid treatment system;

a controller operably coupled to the cooling tower, the controller having a normal operating mode wherein the controller operates the evaporative liquid treatment system to treat the evaporative liquid upon a determination of inadequate evaporative liquid quality based at least in part on the parameter of the evaporative liquid; and the controller having a failsafe operating mode wherein the controller changes operation of the cooling tower upon a determination that the operation of the evaporative liquid treatment system is unable to remedy the inadequate evaporative liquid quality;

wherein the sensor includes at least one of a conductivity sensor, a biofilm sensor, and a pH sensor;

wherein the parameter includes at least one of a conductivity parameter, a biofilm parameter, and a pH parameter; and wherein the controller, in the failsafe operating mode, is configured to bypass consideration of the at least one of the conductivity parameter, biofilm parameter, and pH parameter.

9. The cooling tower system of claim 1 wherein the controller generates a remedial action signal upon the controller operating the liquid treatment system; and the determination that the evaporative liquid treatment system is unable to remedy the inadequate evaporative liquid quality is based at least in part upon the number of remedial action signals exceeding a predetermined number of remedial action signals.

10. The cooling tower system of claim 1 wherein the determination that the evaporative liquid treatment system is unable to remedy the inadequate evaporative liquid quality is based at least in part on the parameter of the evaporative liquid being outside of an acceptable range for longer than a predetermined period of time.

11. The cooling tower system of claim 1 wherein the determination that the evaporative liquid treatment system is unable to remedy the inadequate evaporative liquid quality is based at least in part upon the controller operating the evaporative liquid treatment system a predetermined number of times within a predetermined time period.

12. The cooling tower system of claim 1 wherein the determination of inadequate evaporative liquid quality is based at least in part upon the parameter of the evaporative liquid exceeding a first threshold; and wherein the determination that the operation of the evaporative liquid treatment system is unable to remedy the inadequate evaporative liquid quality is based at least upon the parameter of the evaporative liquid after the operation of the evaporative liquid treatment system exceeding a second threshold different than the first threshold.

13. The cooling tower system of claim 1 wherein the controller is configured to compare the parameter of the evaporative liquid before and after operation of the evaporative liquid treatment system; and wherein the controller is configured to determine the evaporative liquid treatment system is unable to remedy the inadequate evaporative liquid quality based at least in part upon the comparison of the parameter of the evaporative liquid before and after operation of the evaporative liquid treatment system.

14. A cooling tower system comprising:

a cooling tower comprising:

an evaporative heat exchanger, the cooling tower operable to distribute an evaporative liquid onto the evaporative heat exchanger;

a sensor configured to detect a parameter of the evaporative liquid; and an evaporative liquid treatment system;

a controller operably coupled to the cooling tower, the controller having a normal operating mode wherein the controller operates the evaporative liquid treatment system to treat the evaporative liquid upon a determination of inadequate evaporative liquid quality based at least in part on the parameter of the evaporative liquid; and the controller having a failsafe operating mode wherein the controller changes operation of the cooling tower upon a determination that the operation of the evaporative liquid treatment system is unable to remedy the inadequate evaporative liquid quality;

wherein the cooling tower includes a component comprising at least one of a pump, a motor, and a valve;

wherein the controller is configured to detect a failure of the component; and wherein the controller is configured to determine the evaporative liquid treatment system is unable to remedy the inadequate evaporative liquid quality based at least in part upon the failure of the component.

15. The cooling tower system of claim 1 wherein the sensor includes at least one of:
a temperature sensor;
a conductivity sensor;
a bioactive material sensor;
a biofilm sensor;
a pH level sensor;
a plume sensor;
a drift sensor;
a total dissolved solids sensor;
a chlorine sensor; and
a flow rate sensor;
wherein the parameter of the evaporative liquid includes at least one of:
temperature;
water conductivity;
bioactive material;
biofilm;
pH level;
plume;
drift;
total dissolved solids;
chlorine concentration; and
flow rate.

16. The cooling tower system of claim 1 further comprising at least one operating parameter sensor configured to detect an operating parameter including at least one of:
ambient temperature;
sump fluid level;
spray pump operation;
sump sweeper pump operation;
side stream UV pump operation;
UV lamp intensity on make-up; and
wherein the determination of inadequate evaporative liquid quality is based at least in part on the evaporative liquid parameter and the operating parameter.

17. The cooling tower system of claim 1 wherein the evaporative liquid treatment system comprises a microbiological control system.

18. The cooling tower system of claim 1 wherein the evaporative liquid treatment system comprises an ultraviolet light system.

19. The cooling tower system of claim 1 wherein the controller includes communication circuitry, the controller configured to cause the communication circuitry to communicate a notification to a remote computing device upon the determination that the operation of the evaporative liquid treatment system is unable to remedy the inadequate evaporative liquid quality.

20. The cooling tower system of claim 19 wherein the controller remains in the failsafe operating mode until the controller receives a response to the notification.

21. The cooling tower system of claim 1 wherein the evaporative heat exchanger includes a working fluid inlet and a working fluid outlet; and
wherein the cooling tower comprises:
a fan configured to generate airflow relative to the evaporative heat exchanger;
an evaporative liquid distribution system configured to distribute the evaporative liquid onto the evaporative heat exchanger; and
a sump to collect evaporative liquid from the evaporative liquid heat exchanger.

22. The cooling tower system of claim 1 wherein the cooling tower is an open circuit direct evaporative cooling tower; and
wherein the evaporative heat exchanger includes fill.

23. A cooling tower system comprising:
a cooling tower comprising:
an evaporative heat exchanger, the cooling tower operable to distribute an evaporative liquid onto the evaporative heat exchanger;
a sensor configured to detect a parameter of the evaporative liquid; and
an evaporative liquid treatment system;
a controller operably coupled to the cooling tower, the controller having a normal operating mode wherein the controller operates the evaporative liquid treatment system to treat the evaporative liquid upon a determination of inadequate evaporative liquid quality based at least in part on the parameter of the evaporative liquid;
the controller having a failsafe operating mode wherein the controller changes operation of the cooling tower upon a determination that the operation of the evaporative liquid treatment system is unable to remedy the inadequate evaporative liquid quality;
wherein the cooling tower includes a fan and the sensor includes a drift sensor;
wherein the parameter includes a drift parameter; and
wherein the controller, in the failsafe operating mode, changes operation of the cooling tower including at least one of:
decreasing a maximum allowable speed of the fan; and
turning off the fan.

24. A cooling tower system comprising:
a cooling tower comprising:
an evaporative heat exchanger, the cooling tower operable to distribute an evaporative liquid onto the evaporative heat exchanger;
a sensor configured to detect a parameter of the evaporative liquid; and
an evaporative liquid treatment system;
a controller operably coupled to the cooling tower, the controller having a normal operating mode wherein the controller operates the evaporative liquid treatment system to treat the evaporative liquid upon a determination of inadequate evaporative liquid quality based at least in part on the parameter of the evaporative liquid; and
the controller having a failsafe operating mode wherein the controller changes operation of the cooling tower upon a determination that the operation of the evaporative liquid treatment system is unable to remedy the inadequate evaporative liquid quality;

wherein the cooling tower includes a plume abatement system and the sensor includes a plume sensor;

wherein the parameter includes a drift parameter; and wherein the controller, in the failsafe operating mode, changes operation of the cooling tower including at least one of:
turning off the cooling tower; and
operating the plume abatement system.

25. The cooling tower system of claim 1 wherein the controller, in the failsafe operating mode, operates the cooling tower at a preset minimum cooling capacity.

26. A cooling tower comprising:
an evaporative heat exchanger configured to receive a process fluid;
a fan assembly operable to cause airflow relative to the evaporative heat exchanger;
an evaporative liquid distribution system including at least one outlet to distribute evaporative liquid onto the evaporative heat exchanger and a sump to collect evaporative liquid from the evaporative heat exchanger;
an evaporative liquid treatment system of the evaporative liquid distribution system;
an evaporative liquid sensor of the evaporative liquid distribution system configured to detect an evaporative liquid parameter;
a controller operably coupled to the fan assembly and the evaporative liquid distribution system, the controller configured to:
operate the evaporative liquid treatment system upon a determination of inadequate evaporative liquid quality based at least in part on the evaporative liquid parameter; and
change operation of the evaporative liquid distribution system to facilitate safe operation of the cooling tower upon a determination that the evaporative liquid treatment system is unable to remedy the inadequate evaporative liquid quality.

27. The cooling tower of claim 26 wherein the controller is configured to operate the cooling tower in a wet mode wherein the controller causes the evaporative liquid distribution system to distribute the evaporative liquid onto the evaporative heat exchanger and a dry mode wherein the controller limits the evaporative liquid distribution from distributing the evaporative liquid onto the evaporative heat exchanger; and
wherein the controller is configured to change the operation of the evaporative liquid distribution system including refraining from operating the cooling tower in the wet mode upon the determination that evaporative liquid treatment system is unable to remedy the inadequate evaporative liquid quality.

28. The cooling tower of claim 26 wherein the controller is configured to operate the cooling tower in a dry mode, a wet mode, and an adiabatic mode; and
wherein the controller is configured to change the operation of the evaporative liquid distribution system including the controller refraining from operating the cooling tower in the wet mode and the adiabatic mode upon the determination that evaporative liquid treatment system is unable to remedy the inadequate evaporative liquid quality.

29. The cooling tower of claim 26 wherein the evaporative liquid treatment system is operable to purge the evaporative liquid and provide new evaporative liquid; and
wherein the controller is configured to operate the evaporative liquid treatment system including purging the evaporative liquid and providing the new evaporative liquid upon the determination of inadequate evaporative liquid quality.

30. The cooling tower of claim 26 wherein the controller is configured to cause the evaporative liquid treatment system to periodically purge the evaporative liquid and provide new evaporative liquid; and
wherein the controller is configured to change operation of the evaporative liquid distribution system including increasing the frequency of the evaporative liquid distribution system purging the evaporative liquid and providing new evaporative liquid.

31. The cooling tower of claim 26 the controller is configured to operate the evaporative liquid treatment system including at least one of: opening a makeup liquid supply valve, opening a bleed off valve, running a purge and flush cycle, and adding a treatment chemical to the evaporative liquid; and
wherein the controller is configured to change operation of the evaporative liquid distribution system including at least one of turning off a spray pump, adjusting operation of the fan assembly, running a purge and flush cycle, and adding a treatment chemical to the evaporative liquid.

32. The cooling tower of claim 26 wherein the sensor includes at least one of a conductivity sensor, a biofilm sensor, and a pH sensor;
wherein the parameter includes at least one of a conductivity parameter, a biofilm parameter, and a pH parameter; and
wherein the controller is configured to bypass consideration of the at least one of the conductivity parameter, biofilm parameter, and pH parameter after the controller changes operation of the evaporative liquid distribution system.

33. The cooling tower of claim 26 wherein the determination that the evaporative liquid treatment system is unable to address the inadequate evaporative liquid quality is based at least in part upon the controller operating the evaporative liquid treatment system a predetermined number of times within a predetermined time period.

34. The cooling tower of claim 26 wherein the determination that the evaporative liquid treatment system is unable to address the inadequate evaporative liquid quality is based at least in part on the parameter of the evaporative liquid being beyond a threshold for longer than a predetermined period of time.

35. The cooling tower of claim 26 wherein the sensor is operable to detect the evaporative liquid parameter after the controller operates the evaporative liquid treatment system; and
wherein the determination that the evaporative liquid treatment system is unable to address the inadequate evaporative liquid quality is based at least in part on the evaporative liquid parameter after the controller operates the evaporative liquid treatment system.

36. The cooling tower of claim 26 wherein the controller is configured to detect a failure of at least one component of the evaporative liquid distribution system; and
wherein the determination that the evaporative liquid distribution system is unable to address the inadequate liquid quality is based at least in part upon the failure of the at least one component of the evaporative liquid distribution system.

37. The cooling tower of claim 26 wherein the evaporative liquid distribution system includes a spray pump; and
wherein the controller is configured to change operation of the evaporative liquid distribution system including keeping the spray pump turned off.

38. The cooling tower of claim 26 wherein the controller includes communication circuitry;
wherein the controller is configured to cause the communication circuitry to communicate a notification to a remote computing device upon the determination that the evaporative liquid treatment system is unable to remedy the inadequate evaporative liquid quality; and
wherein the controller maintains the change to the evaporative liquid distribution system until the controller receives a response to the notification.

39. The cooling tower of claim 26 wherein the evaporative liquid treatment system comprises:
a circulation circuit;
a pump operable to direct evaporative liquid about the circulation circuit; and
an ultraviolet light treatment system configured to treat evaporative liquid of the circulation system.

40. The cooling tower of claim 26 wherein the evaporative liquid treatment system comprises:
a makeup liquid supply; and
an ultraviolet light treatment system configured to treat makeup liquid provided by the makeup liquid supply.

41. The cooling tower of claim 26 wherein the evaporative liquid treatment system comprises a chemical treatment system configured to add a chemical treatment to the evaporative liquid.

42. The cooling tower of claim 26 wherein the parameter of the evaporative liquid includes at least one of:
temperature;
conductivity;
bioactive material;
biofilm;
pH level;
plume; and
drift.

43. The cooling tower of claim 26 further comprising at least one operating parameter sensor configured to detect an operating parameter including at least one of:
ambient temperature;
sump fluid level;
spray pump operation;
sump sweeper pump;
side stream UV pump operation;
UV lamp intensity on make-up; and
wherein the determination of inadequate evaporative liquid quality is based at least in part on the evaporative liquid parameter and the operating parameter.

44. The cooling tower of claim 26 further comprising a collector to collect at least a portion of the evaporative liquid from the evaporative heat exchanger and direct the evaporative liquid toward the sump; and
wherein the fan assembly is below the collector.

45. The cooling tower of claim 26 further comprising an outer structure;
wherein the indirect heat exchanger is in the outer structure;
wherein the outer structure has a footprint; and
wherein the sump is smaller than half the footprint of the outer structure.

46. A method of operating a cooling tower, the method comprising:
distributing an evaporative liquid onto an evaporative heat exchanger of the cooling tower;
detecting a parameter of the evaporative liquid using a sensor of the cooling tower;
operating an evaporative liquid treatment system of the cooling tower upon a determination of inadequate evaporative liquid quality based at least in part on the evaporative liquid parameter;
detecting the parameter of the evaporative liquid using the sensor after operating the evaporative liquid treatment system;
determining whether the evaporative liquid treatment system is unable to remedy the inadequate evaporative liquid quality based at least in part upon the parameter of the evaporative liquid detected after operating the evaporative liquid treatment system; and
changing operation of the cooling tower to facilitate safe operation of the cooling tower upon a determination that the evaporative liquid treatment system is unable to remedy the inadequate evaporative liquid quality.

47. The method of claim 46 wherein the cooling tower is operable in a plurality of modes including a wet mode and a dry mode; and
wherein changing operation of the cooling tower includes refraining from operating the cooling tower in the wet mode.

48. The method of claim 47 wherein the plurality of modes includes an adiabatic mode; and
wherein changing operation of the cooling tower includes refraining from operating the cooling tower in the wet mode and the adiabatic mode.

49. The method of claim 47 further comprising:
at a controller of the cooling tower:
receiving an operational parameter including at least one of ambient temperature, humidity, wet bulb temperature, and dry bulb temperature;
receiving a process fluid temperature request;
determining whether the cooling tower is to be operated in the wet mode to satisfy the process fluid temperature request based at least in part on the operational parameter; and
wherein refraining from operating the cooling tower in the wet mode includes refraining from operating the cooling tower in the wet mode despite the controller determining the cooling tower is to be operated in the wet mode to satisfy the process fluid temperature request.

50. The method of claim 46 further comprising periodically causing the evaporative liquid treatment system to purge and flush the cooling tower; and
wherein changing operation of the cooling tower includes causing the evaporative liquid treatment system to purge and flush the cooling tower more frequently.

51. The method of claim 46 wherein operating the evaporative liquid treatment system includes at least one of: operating a makeup liquid supply valve, opening a bleed off valve, running a purge and flush cycle, and adding a treatment chemical to the evaporative liquid; and
wherein changing operation of the cooling tower includes at least one of turning off a spray pump, reducing the speed of a fan of the cooling tower, running a purge and flush cycle, and adding a treatment chemical to the evaporative liquid.

52. The method of claim 46 wherein the parameter includes at least one of a conductivity parameter, a biofilm parameter, and a pH parameter;

wherein the determination of inadequate evaporative liquid quality is based upon the at least one of the conductivity parameter, the biofilm parameter, and the pH parameter; and wherein changing operation of the cooling tower includes a controller of the cooling tower bypassing consideration of the at least one of the conductivity parameter, the biofilm parameter, and the pH parameter.

53. The method of claim 46 wherein the determination that the evaporative liquid treatment system is unable to remedy the inadequate evaporative liquid quality is based at least in part on the parameter of the evaporative liquid being outside of an acceptable range for longer than a predetermined period of time.

54. The method of claim 46 further comprising monitoring a number of times a controller of the cooling tower operates the evaporative liquid treatment system within a predetermined period of time; and wherein the determination that the evaporative liquid treatment system is unable to remedy the inadequate evaporative liquid quality is based at least in part upon the controller operating the evaporative liquid treatment system a predetermined number of times within a predetermined time period.

55. The method of claim 46 wherein detecting the parameter of the evaporative liquid using the sensor comprises detecting the parameter of the evaporative liquid before the operation of the evaporative liquid treatment system; and wherein the determination that the evaporative liquid treatment system is unable to remedy the inadequate evaporative liquid quality is based at least in part on the parameter of the evaporative liquid before and after operation of the evaporative liquid treatment system.

56. The method of claim 46 further comprising detecting a failure of a component of the cooling tower; and wherein the determination that the evaporative liquid treatment system is unable to remedy the inadequate evaporative liquid quality is based at least in part on the failure of the component of the cooling tower.

57. The method of claim 46 wherein the parameter of the evaporative liquid includes at least one of:
temperature;
conductivity;
bioactive material;
biofilm;
pH level;
plume; and
drift.

58. The method of claim 46 further comprising communicating a notification to a remote computing device upon the determination that the operation of the evaporative liquid treatment system is unable to remedy the inadequate evaporative liquid quality.

59. The cooling tower system of claim 1 wherein the cooling tower is configured to receive a process fluid at a higher temperature, remove heat from the process fluid, and return the process fluid at a lower, requested process fluid temperature;

wherein the evaporative heat exchanger comprises a direct heat exchanger;

wherein the evaporative liquid comprises the process fluid; and wherein the cooling tower is operable to distribute the process fluid onto the direct heat exchanger for removing heat from the process fluid.

* * * * *